(12) United States Patent
Bargeron et al.

(10) Patent No.: US 7,475,061 B2
(45) Date of Patent: Jan. 6, 2009

(54) IMAGE-BASED DOCUMENT INDEXING AND RETRIEVAL

(75) Inventors: David M. Bargeron, Seattle, WA (US); Patrice Y. Simard, Bellevue, WA (US); Vivek Srivastava, Lucknow (IN)

(73) Assignee: Microsoft Corporation, Redmond, WA (US)

( * ) Notice: Subject to any disclaimer, the term of this patent is extended or adjusted under 35 U.S.C. 154(b) by 508 days.

(21) Appl. No.: 10/758,370

(22) Filed: Jan. 15, 2004

(65) Prior Publication Data

US 2005/0165747 A1 Jul. 28, 2005

(51) Int. Cl.
*G06F 7/00* (2006.01)
*G06F 17/30* (2006.01)

(52) U.S. Cl. .................. 707/3; 707/6; 707/4; 382/176; 382/305

(58) Field of Classification Search .............. 382/100, 382/176, 305, 23, 175; 713/187, 197; 707/1; 380/23
See application file for complete search history.

(56) References Cited

U.S. PATENT DOCUMENTS

| | | | |
|---|---|---|---|
| 3,701,095 A | 10/1972 | Yamaguchi et al. | |
| 4,955,066 A | 9/1990 | Notenboom | |
| 5,109,433 A | 4/1992 | Notenboom | |
| 5,181,255 A * | 1/1993 | Bloomberg | 382/176 |
| 5,465,353 A | 11/1995 | Hull et al. | |
| 5,499,294 A * | 3/1996 | Friedman | 713/179 |
| 5,526,444 A | 6/1996 | Kopec et al. | |
| 5,542,006 A | 7/1996 | Shustorovich et al. | |
| 5,594,809 A | 1/1997 | Kopec et al. | |
| 5,812,698 A | 9/1998 | Platt et al. | |
| 5,867,597 A | 2/1999 | Peairs et al. | |
| 6,397,212 B1 | 5/2002 | Biffar | |
| 6,470,094 B1 * | 10/2002 | Lienhart et al. | 382/176 |
| 6,487,301 B1 * | 11/2002 | Zhao | 382/100 |
| 6,523,134 B2 | 2/2003 | Korenshtein | |
| 6,546,385 B1 | 4/2003 | Mao et al. | |
| 6,580,806 B1 * | 6/2003 | Sato | 382/100 |
| 6,587,217 B1 | 7/2003 | Lahey et al. | |
| 6,594,393 B1 | 7/2003 | Minka et al. | |
| 6,658,623 B1 | 12/2003 | Schilit et al. | |
| 6,869,023 B2 * | 3/2005 | Hawes | 235/494 |
| 6,928,548 B1 * | 8/2005 | Hale et al. | 713/187 |
| 7,062,497 B2 | 6/2006 | Hamburg et al. | |
| 7,327,883 B2 | 2/2008 | Polonowski | |
| 2002/0032698 A1 | 3/2002 | Cox | |
| 2002/0116379 A1 | 8/2002 | Lee et al. | |

(Continued)

OTHER PUBLICATIONS

Shin-Ywang Wang et al. "Block Selection: A Method for Segmenting Page Image of Various Editing Styles", Cannon Information Systems, 1995 IEEE.*

(Continued)

*Primary Examiner*—Jean M Corrielus
*Assistant Examiner*—Giovanna Colan
(74) *Attorney, Agent, or Firm*—Amin, Turocy & Calvin, LLP

(57) ABSTRACT

A system that facilitates document retrieval and/or indexing is provided. A component receives an image of a document, and a search component searches data store(s) for a match to the document image. The match is performed over word-level topological properties of images of documents stored in the data store(s).

41 Claims, 16 Drawing Sheets

U.S. PATENT DOCUMENTS

| | | | |
|---|---|---|---|
| 2003/0076537 | A1 | 4/2003 | Brown |
| 2003/0123733 | A1 | 7/2003 | Keskar et al. |
| 2003/0152293 | A1* | 8/2003 | Bresler et al. ............... 382/305 |
| 2004/0003261 | A1* | 1/2004 | Hayashi ...................... 713/187 |
| 2004/0015697 | A1* | 1/2004 | de Queiroz ................. 713/176 |
| 2004/0078757 | A1 | 4/2004 | Golovchinsky et al. |
| 2004/0090439 | A1 | 5/2004 | Dillner |
| 2004/0107348 | A1* | 6/2004 | Iwamura ..................... 713/176 |
| 2004/0189667 | A1 | 9/2004 | Beda et al. |
| 2004/0205542 | A1 | 10/2004 | Bargeron et al. |
| 2004/0205545 | A1 | 10/2004 | Bargeron et al. |
| 2004/0252888 | A1 | 12/2004 | Bargeron et al. |
| 2005/0165747 | A1 | 7/2005 | Bargeron et al. |
| 2006/0045337 | A1 | 3/2006 | Shilman et al. |
| 2006/0050969 | A1 | 3/2006 | Shilman et al. |

OTHER PUBLICATIONS

Ming Ye et al. "Document Image Matching and Annotation Lifting", 2001 IEEE.*

Ming Ye et al. (Non-Patent Literature: "Document Image Matching and Annotation Lifting", 2001 IEEE).*

Shin-Ywan Wang et al. (Non-Patent Literature: "Block Selection: A Method for Segmenting Page Image of Various Editing Styles", Canon Information Systems, 1995 IEEE).*

Benolin Jose, et al. Vector Based Image Matching for Indexing in Case Based Reasoning Systems. 4th German Workshop on Case-based Reasoning-System Development and Evaluation, pp. 1#7, 1996.

S. Marinai, et al., "Recognizing Freeform Digital Ink Annotations" Proceedings of the 6th International Workshop on Document Analysis Systems, 2004, vol. 2163, pp. 322-331.

G. Golovchinsky, et al., "Moving Markup: Repositioning Freeform Annotation" UIST 02. Proceedings of the 15th Annual ACM Symposium on user Interface Software and Technology, 2002, vol. conf. 15, pp. 21-29.

European Search Report dated Dec. 29, 2006, mailed for European Patent Application Serial No. 05 108 068.7, 2 Pages.

European Search Report dated Feb. 1, 2006 for European Patent Application No. EP05000750. 7 pages.

J.J. Hull. Document Image Matching and Retrieval with Multiple Distortion-Invariant Descriptors. Document Analysis Systems, World Scientific Publishing Co. 1995. Retrieved from the internet: http://rii.richoh.com/{hull/pubs/hull_das94.pdf>. Retrieved on Dec. 6, 2005.

J.J. Hull, et al. Document Image Matching Techniques. Symposium on Document Image Understanding Technology, Apr. 30, 1997, p. 31-35.

Wang Shin-Ywan, et al. Block selection: a method for segmenting a page image of various editing styles. Document Analysis and Recognition, 1995. Proceedings of the Third International Conference on Montreal, Quebec, Canada. Aug. 14-16, 1995. Los Alamitos, CA, USA, IEEE Comput. Soc., US, vol. 1, Aug. 14, 1995, pp. 128-133.

V. Eglin, et al. Document page similarity based on layout visual saliency: application to query by example and document classification. Document Analysis and Recognition, 2003. Proceedings of the 7th International Conference. Aug. 3-6, 2003. Piscataway, NJ. IEEE, Aug. 3, 2003, pp. 1208-1212.

C.L. Tan, et al. Text extraction using pyramid. Pattern Recognition, Elsevier, Kidlington, GB, vol. 1, No. 1. Jan. 1998, pp. 63-72.

H. Peng, et al. Document image template matching based on component block list. Pattern Recognition Letters, North-Holland Publ. Amsterdam, NL, vol. 22, No. 9, Jul. 2001, pp. 1033-1042.

D. Doermann. The Indexing and Retrieval of Document Images: A Survey. Computer Vision and Image Understanding, Academic Press, San Diego, CA, US, vol. 70, No. 3, Jun. 1998, pp. 287-298.

D. Doermann, et al. The detection of duplicates in document image databases. Proceedings of the 4th International Conference on Document Analysis and Recognition. Ulm, Germany, Aug. 18-20, 1997, Proceedings of the ICDAR, Los Alamitos, IEEE Comp. Soc. US, vol. II, Aug. 18, 1997, pp. 314-318.

S. Mitaim, et al. Neural fuzzy agents that learn a user's preference map. Digital Libraries, 1997. ADL '97. Proceedings, IEEE International Forum on Research and Technology Advances in Washington, D.C., US, May 7-9, 1997, Los Alamitos, CA, US. IEEE Comput. Soc., US, May 7, 1997, pp. 25-35.

B. Erol, et al. Institute of Electrical and Electronics Engineers: Linking presentation documents using image analysis. Conference Record of hte 37th. Asilomar Conference on Signals, Systems, & Computers. Pacific Grove, CA, US, Nov. 9-12, 2003. Asilomar Conference on Signals, Systems and Computers, New York, NY, IEEE, US, vol. 1 of 2.

Tung-Shou Chen, et al., A New Search Engine for Chinese Document Image Retrieval Based on Chinese Character Segmentation Features, International Journal of Computer Processing of Oriental Languages, 2002, pp. 417-431, vol. 14-No. 4.

David Doermann, The Indexing and Retrieval of Document Images: A Survey, Computer Vision and Image Understanding: CVIU, 1998, pp. 1-37.

David Doermann, et al., The Detection of Duplicates in Document Image Databases, Proceedings of the International Conference on Document Analysis and Recognition, 1997, pp. 1-37.

Jonathan J. Hull, et al., Document Image Similarity and Equivalence Detection, ICDAR'97, 1997, pp. 308-312, vol. 1, Ulm, Germany.

John F. Cullen, et al., Document Image Database Retrieval and Browsing using Texture Analysis, ICDAR'97, 1997, pp. 718-721, Ulm, Germany.

Nevin Heintze, Scalable Document Fingerprinting(Extended Abstract), Proceedings of the Second USENIX Workshop on Electronic Commerce, 1996, pp. 1-10.

Narayanan Shivakumar, et al., The SCAM Approach to Copy Detection in Digital Libraries, D-Lib Magazine, 1995, 9 pages.

Sergey Brin, et al., Copy Detection Mechanisms for Digital Documents, Proceedings of the ACM SIGMOD Annual Conference, 1995, pp. 1-21.

B. Erol, et al. Institute of Electrical and Electronics Engineers: Linking presentation documents using image analysis. Conference record of the 37th Asilomar Conference on signals, systems, and computers. Pacific Grove, CA. Nov. 9-12, 2003. Asilomar Conf. on Signals, Systems, & Computers, New York, NY: IEEE, US, vol. 1 of 2. Conf. 37, pp. 97-101.

R. Hauck. Partial European Search Report. Apr. 15, 2005, Munich, Germany, 2 pages.

U.S. Appl. No. 11/095,393, David Bargeron et al.

U.S. Appl. No. 11/165,070, David Bargeron.

U.S. Appl. No. 11/171,064, David Bargeron.

Vinajak R. Borkar, et al., Automatically extracting structure from free text addresses, 2000, 6 pages, In Bulletin of the IEEE Computer Society Technical committee on Data Engineering. IEEE.

Remco Bouckaert, Low level information extraction: A bayesian network based approach, 2002, 9 pages, In Proceedings of TextML 2002, Sydney, Australia.

Claire Cardie, et al., Proposal for an interactive environment for information extraction, 1998, 12 pages, Technical Report TR98-1702, 2.

Rich Caruana, et al., High precision information extraction, Aug. 2000, 7 pages, in KDD-2000 Workshop on Text Mining.

M. Collins, Discriminative training methods for hidden markov models : Theory and experiments with perception algorithms, Jul. 2002, pp. 1-8, In Proceedings of Empirical Methods in Natural Language Processing (EMNLP02).

Corinna Cortes, et al., Support-vector networks. Machine Learning, 1995, 20(3): 273-297.

Y. Freund, et al., Large margin classification using the perceptron algorithm, Machine earning, 37(3):277-296.

Y. Freund, et al., Experiments with a new boosting algorithm, 1996, In International Conference on Machine Learning, pp. 148-156.

T. Kristjansson, et al., Interactive information extraction with constrained conditional random fields, 2004, In Proceedings of the 19th international conference on artificial intelligence, AAAI. pp. 412-418.

John Lafferty, et al., Conditional random fields: Probabilistic models for segmenting and labeling sequencing data, 2001, In Proc. 18th International Conf. on Machine Learning, pp. 282-289. Morgan Kaufmann, San Francisco, CA.

M. Marcus, et al., The penn treebank: Annotating predicate argument structure, 1994, pp. 114-119.

Andrew McCallum, Effciently inducing features of conditional random fields, 2003, 8 pages, In Nineteenth Conference on Uncertainty in Artificial Intelligence (UAI03).

Andrew McCallum, et al., Early results for named entity recognition with conditional random fields, feature induction and web-enhanced lexicons, 2003, 4 pages, In Hearst/Ostendorf, Eds, HLT-NAACL, Ass'n for Computational Linguistics, Edmonton, Alberta, Canada.

Kamal Nigam, et al., Using maximum entropy for text classification, 1999, 7 pages, In Proceedings of the IJCAI'99 Workshop on Information Filtering.

David Pinto, et al., Table extraction using conditional random fields, 2003, 8 pages, In Proceedings of the ACM SIGIR'03, Jul. 28-Aug. 1, 2003, Toronto, Canada.

L.R. Rabiner, A tutorial on hidden markov models and selected applications in speech recognition, 1989, In Proceedings of the IEEE, vol. 77, pp. 257-286.

Fei Sha, et al., Shallow parsing with conditional random fields. In Hearst/Ostendorf, Eds, 2003, HLT-NAACL: Main Proceedings, pp. 213-220, Ass'n for Computational Linguistics, Edmonton, Alberta, Canada.

J. Stylos, et al., Citrine:providing intelligent copy-and-paste, 2005, In Proceedings of ACM Symposium on User Interface Software and Technology (UIST 2004), pp. 185-188.

B. Taskar, et al., Max-margin parsing, 2004, 8 pages, In Empirical Methods in Natural Language Processing (EMNLP04).

S. Mao, et al., Document structure analysis algorithms: A literature survey, Jan. 2003, vol. 5010, pp. 197-207, In Proc. SPIE Electronic Imaging.

M. Krishnamoorthy, et al., Syntactic segmentation and labeling of digitized pages from technical journals, 1993, IEEE Transactions on Pattern Analysis and Machine Intelligence, vol. 15, pp. 737-747.

J. Kim, et al., Automated labeling in document images, Jan. 2001, pp. 1-12, In Document Recognition and Retrieval VIII, vol. 4307. Available online at http://archive.nlm.nih.gov/pubs/kim/spie2001/spie2001.pdf, last checked Apr. 2, 2006.

D. Niyogi, et al., Knowledge-based derivation of document logical structure, 1995, p. 472-475, In Third International Conference on Document Analysis and Recognition, Montreal, Canada.

A. Conway, Page Grammars and Page Parsing: A Syntactic Approach to Document Layout Recognition, 1993, In Proceedings of the 2nd International Conference on Document Analysis and Recognition, Tsukuba Science City, Japan, pp. 761-764.

E.G. Miller, et al., Ambiguity and constraint in mathematical expression recognition, 1998, 8 pages, In Proceedings of the National Conference of Artificial Intelligence. American Association of Artificial Intelligence.

T. Tokuyasu, et al., Turbo recognition: a statistical approach to layout analysis, 2001, in Proceedings of the SPIE, San Jose, CA, vol. 4307, pp. 123-129.

T. Kanungo, et al., Stochastic language model for style-directed physical layout analysis of documents, 2003, pp. 583-596, In IEEE Transactions on Image Processing, vol. 5, No. 5.

D. Blostein, et al., Applying compiler techniques to diagram recognition, In Proceedings of the 16th International Conference on Pattern Recognition, 2002, vol. 3, pp. 123-136.

J. F. Hull, Recognition of mathematics using a two dimensional trainable context-free grammar, Master's thesis, MIT, Jun. 1996, 101 pages.

N. Matsakis, Recognition of handwritten mathematical expressions, May 1999, p. 1-59, Master's thesis, Massachusetts Institute of Technology, Cambridge, MA.

J. Lafferty, et al., Conditional Random Fields: Probabilistic Models for Segmenting and Labeling Sequence Data, 2001, In Proceedings of the 18th International Conference on Machine Learning, Morgan Kaufmann, San Francisco, CA, pp. 282-289.

E. Charniak, et al., Edge-Based Best-First Chart Parsing, 1998, In Proceedings of the 14th National Conference on Artificial Intelligence, pp. 127-133.

D. Klein, et al., A* parsing: Fast Exact Viterbi Parse Selection, Stanford University, 2001, 8 pages, Tech. Rep. dbpubs/2002-16.

Y. Freund, et al., A Decision-Theoretic Generalization of On-line Learning and an Application to Boosting, 1995, In Computational Learning Theory: Eurocolt '95, Springer-Verlag, pp. 23-37.

I. Philips, et al., Cd-rom Document Database Standard, In Proceedings of the 2nd International Conference on Document Analysis and Recognition (ICDAR), 1993, pp. 478-483.

P. Viola, et al., Rapid Object Detection Using a Boosted Cascade of Simple Features, 2001, p. 1-9, In Proceedings of the IEEE Conference on Computer Vision and Pattern.

T. Breuel, High Performance Document Layout Analysis, 10 pages, In 2003 Symposium on Document Image Understanding Technology, Greenbelt Maryland.

R. Zanibbi, et al., A Survey of Table Recognition: Models, Observations, Transformations, and Inferences, International Journal of Document Analysis and Recognition, 2004, vol. 7, No. 1. pp. 1-16.

K. F. Chan, et al., Mathematical Expression Recognition: A Survey, 2000, International Journal on Document Analysis and Recognition, vol. 3, pp. 3-15.

E. Charniak, Statistical Techniques for Natural Language Parsing, AI Magazine, 1997, vol. 18, No. 4, pp. 33-44.

M. Kay, Chart Generation, In Proceedings of the 34th Annual Meeting of the Association for Computational Linguistics (ACL '96), Santa Cruz, California, 1996, pp. 200-204.

M. Viswanathan, et al., Document Recognition: An Attribute Grammar Approach, Mar. 1996, In Proc. SPIE vol. 2660, Document Recognition III, Vincent/Hull, Eds., pp. 101-111.

C.D. Manning, et al., Foundations of Statistical Natural Language Processing. The MIT Press, 1999, p. 1-3.

Tobias Schefer, et al., Active Hidden Markov Models For Information Extraction, In Advances in Intelligent Data Analysis, 4th International Conference, IDA 2001, pp. 309-318.

P. Chou, Recognition Of Equations Using a 2-D Stochastic Context-Free Grammar, In SPIE Conference on Visual Communications and Image Processing, Philadelphia, PA, 1989, pp. 852-863.

M. Kay, Algorithm Schemata And Data Structures In Syntactic Processing, 1986, pp. 35-70.

Michael Shilman, et al., Spatial Recognition and Grouping of Text and Graphics, Eurographics Workshop on Sketch-Based Interfaces and Modeling, 2004, 5 pages, Hughes/Jorge, Eds.

Michael Shilman, et al., Recognition and Grouping of Handwritten Text in Diagrams and Equations, IWFHR 2004, Sep. 2004, pp. 69-77, Toyko, Japan.

Michael Shilman, et al., Recognizing Freeform Digital Ink Annotations, IAPR International Workshop on Document Analysis Systems, Sep. 8-10, 2004, 12 pages, Florence, Italy.

Michael Collins, et al., "Logistic Regression, AdaBoost, and Bregman Distances", Machine Learning, 48(1/2/3) 2002.

Thomas M. Cormen, et al., "Introduction to Algorithms", Cambridge, MA: The MIT Press, 1990, p. 448.

Hans P. Graf, et al., "Analysis of Complex and Noisy Check Images", Proceedings of IEEE International Conference on Image Processing (KIP-95). IEEE Computer Society Press, 1995, pp. 316-319.

Patrice Y. Simard, et al., "An Efficient Binary Image Activity Detector Based on Connected Components", International Conference on Acoustic, Speech and Signal Processing (ICASSP), Montreal, May 2004 p. 229-232.

Yoav Freund, et al., "Experiments with a New Boosting Algorithm". Machine Learning: Proceedings of the Thirteenth International Conference, 1996. pp. 148-156.

Ihsin Phillips, et al., "CD-ROM Document Database Standard" Proc. Second Int'l Conf. on Document Analysis and Recognition, 1993, pp. 478-483.

Yefeng Zheng, et al., "Machine Printed Text and Handwriting Identification in Noisy Document Images" In IEEE Transactions on Pattern Analysis and Machine Intelligence vol. 26, No. 3, Mar. 2003. pp. 337-353.

David Bargeron, et al. Boosting-Based Transductive Learning for Text Detection. Proceedings of the 8th International Conference on Document Analysis and Recognition (ICDAR'05), pp. 1166-1171.

Ming Ye, et al. Document Image Matching and Annotation Lifting. Proceedings of the 6th International Conference on Document Analysis and Recognition (ICDAR 2001), Seattle, Washington, Sep. 10-13, 2001, pp. 753-760.

"About Virtual Desktop Managers". Accessible from http://www.virtual-desktop.info. Last accessed on May 17, 2006, 3 pages.

Vladimir N. Vapnik, Statistical Learning Theory, 1998, pt. 1, 62 pages (front cover-40).

Vladimir N. Vapnik, Statistical Learning Theory, 1998, pt. 2, 62 pages (41-100).

Vladimir N. Vapnik, Statistical Learning Theory, 1998, pt. 3, 62 pages (101-162).

Vladimir N. Vapnik, Statistical Learning Theory, 1998, pt. 4, 62 pages (163-226).

Vladimir N. Vapnik, Statistical Learning Theory, 1998, pt. 5, 60 pages (227-287).

Vladimir N. Vapnik, Statistical Learning Theory, 1998, pt. 6, 60 pages (288-348).

Vladimir N. Vapnik, Statistical Learning Theory, 1998, pt. 7, 62 pages (349-413).

Vladimir N. Vapnik, Statistical Learning Theory, 1998, pt. 8, 50 pages (414-464).

Vladimir N. Vapnik, Statistical Learning Theory, 1998, pt. 9, 41 pages (465-505).

Vladimir N. Vapnik, Statistical Learning Theory, 1998, pt. 10, 35 pages (506-540).

Vladimir N. Vapnik, Statistical Learning Theory, 1998, pt. 11, 35 pages (541-576).

Vladimir N. Vapnik, Statistical Learning Theory, 1998, pt. 12, 65 pages (577-642).

Vladimir N. Vapnik, Statistical Learning Theory, 1998, pt. 13, 45 pages (643-686).

Vladimir N. Vapnik, Statistical Learning Theory, 1998, pt. 14, 50 pages (687-back cover).

Sriram Ramachandran and Ramanujan Kashi, "An Architecture for ink Annotations on Web Documents", Proceedings of the Seventh International Conference on Document Analysis and Recognition, Aug. 3-6, 2003 pp. 256-260 vol. 1 Retrieved from IEEE Xplore on Sep. 27, 2006.

Ivan Poupyrev, Numada Tomokazu and Suzanne Weghorst, "Virtual Notepad: Handwriting in Immersive VR", IEEE, Proceedings of VRAIS' Atlanta, Georgia, Mar. 1998 Retrieved from CiteSeer on Sep. 28, 2006.

Marcel Gotze, Stefan Schlechtweg and Thomas Strothotte, "The Intelligent Pen—Toward a Uniform Treatment of Electronic Documents", 2002 Retrieved from CiteSeer on Sep. 28, 2006.

Yoav Freund, et al., "Experiments with a New Boosting Algorithm". Machine Learning: Proceedings of the Thirteenth International Conference, 1996, 9 pages.

David Bargeron, et al. "Boosting-Based Transductive Learning for Text Detection". Proceedings of the 8th International Conference on Document Analysis and Recognition (ICDAR'05), pp. 1166-1171.

"About Virtual Desktop Managers". Accessible at http://www.virtual-desktop.info. Last accessed on May 17, 2006, 3 pages.

Ivan Poupyrev, Numada Tomokazu and Suzanne Weghorst, "Virtual Notepad: Handwriting in Immersive VR", IEEE, Proceedings of VRAIS' Atlanta, Georgia, Mar. 1998 Retrieved from CiteSeer on Sep. 29, 2006.

Marcel Gotze, Stefan Schlechtweg and Thomas Strothotte, "The Intelligent Pen—Toward a Uniform Treatment of Electronic Documents", 2002 Retrieved from CiteSeer on Sep. 29, 2006.

Murphey, et al. "Neural Learning Using AdaBoost" (2001) IEEE, 6 pages.

* cited by examiner

IMAGE-BASED DOCUMENT INDEXING AND RETRIEVAL

TECHNICAL FIELD

The present invention generally relates to indexing and/or retrieval of a stored electronic document by comparing an index signature of the stored document with an index signature generated from a printed version of the stored document.

BACKGROUND OF THE INVENTION

Advancement within computing and communications technology has significantly altered business practice regarding transfer of information via documents. Formatted documents can now be delivered electronically over a substantial distance almost instantaneously. In business and personal environments, however, a substantial amount of reviewing and/or editing is completed on printed documents. For instance, meetings within a work environment typically include distributing printed documents to those in attendance. Moreover, many individuals prefer reading and/or editing documents on paper rather than reading and/or editing on a computer screen.

In a business or personal environment wherein a substantial amount of documents are printed, indexing such documents to their respective electronic versions is problematic. Damage to documents, including stains and tears, as well as annotations made upon the printed documents can cause further difficulties in relating the printed documents to their respective electronic versions. For example, a document can be printed and distributed at a meeting, and attendants of the meeting may annotate the documents via pen or similar marking tool according to thoughts regarding the meeting in connection with information in the document. The document may then be folded, smudged, torn, and/or damaged in another similar manner as it is placed in a folder and transported from the meeting to a different location. Thereafter the document can lie within a stack of other documents for hours, days, or even months. If an electronic version of the printed document is desirably located, a significant amount of time can be required to locate such electronic version. Furthermore, if the electronic version of the document cannot be located, resources may have to be allocated to re-type the document into a computer.

Other scenarios also exist in which locating an electronic version of a document based upon a physical version of the document (e.g., printed version) can be problematic. For example, a vendor can prepare and fax a draft purchase-order to a consumer, and upon receipt of such purchase-order the consumer can modify contents of the faxed document by physically modifying the document via pen or other suitable marking tool. Thereafter, the consumer can relay the modified document back to the vendor via a fax. In order to locate the electronic version of the printed document, the vendor must search through the database and match the printed version of the document to the electronic version of the document by hand. Correlating between the electronic version and the printed version of the document can require a substantial amount of time, especially in instances when a person who created the document is unavailable to assist in matching the printed document to its electronic counterpart (e.g., the individual takes vacation, retires, . . . ).

Conventional systems and/or methodologies for remedying problems associated with indexing physical documents with corresponding electronic documents require marking a printed document with identifying information. For example, a file location can be included in each printed document (e.g., in a header of each printed document, an extended file location relating to a corresponding electronic version can be printed to enable locating the electronic version). Alternatively, unique bar codes can be placed on each printed document, wherein the bar codes can be employed to locate an electronic version of the document. For example, a bar-code scanner can be utilized to scan a barcode on a printed document, and a corresponding electronic version of the document can be retrieved based upon the scanning. Such identifying information, however, is aesthetically displeasing as such information clutters the document. Moreover, tears, smudges, annotation or other physical damage/alteration to a printed document can render such conventional systems and or methodologies substantially useless. For example, if a portion of a bar code is torn from the printed document, a bar code scanner will not be able to correctly read the bar code. Similarly, a smudge on a document can render unreadable a printed location of an electronic version of the document. Optical character recognition (OCR) can also be employed in connection with locating an electronic version of a document based upon a printed version. For instance, the printed document can be digitized (e.g., via a scanner, digital camera, . . . ), and a computing component can utilize OCR to identify particular characters in the digitized printed document and match such characters to corresponding characters in the electronic version of the printed document. Such a technique, however, requires a substantial amount of computing resources. Furthermore, a database can comprise several hundred or several thousand documents, and performing OCR on several documents can take a significant amount of time. Other applications that are employed to locate an electronic version of a document based on a printed document utilize keywords (e.g., date modified or other keywords) to locate the electronic version. It is, however, difficult to obtain keywords, and several documents can include such keywords.

In view of at least the above, there exists a strong need in the art for a system and/or methodology for a robust indexing of electronic documents and corresponding physical documents, as well as a system and/or methodology enabling retrieval of an electronic document based upon a printed version of the document, as well as information associated with the electronic document (e.g., database records, workflow, . . . ).

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention facilitates indexing and/or retrieval of a stored electronic document by comparing a signature related to the stored document with a signature related to an image of a printed document corresponding to such stored document. The present invention utilizes word level topological properties of the documents to generate the signatures, thereby enabling a retrieval of a stored document to be completed expediently and robustly without deficiencies associated with conventional systems and/or methods. Signatures that identify the stored electronic documents are generated via obtaining data related to word-layout within each document. It is to be understood that signatures can be generated in a manner that enables a signature to identify a document even in the presence of noise (e.g., printing noise). Thus, each signature can robustly identify a particular document, as the signatures are associated with features that are highly specific to a document. For example, a location of at least a portion of words within a document as well as width of words within the document can be utilized to create a signature that robustly identifies the document, as a probability of two disparate documents having a substantially similar word layout pattern is extremely small. In accordance with one aspect of the present invention, the signatures are generated upon loading data store(s) that contain images of electronic documents that may correspond to a printed document. For example, the data store(s) can be loaded (and signatures generated) upon receipt of a request to locate a particular electronic document based upon an image of the printed document. A signature utilizing word-layout of the image of the printed document is generated upon receipt of the image, and thereafter such signature can be compared to the signatures related to the electronic documents (e.g., signatures generated via utilizing images of stored electronic documents). The electronic document associated with the signature that most substantially matches the signature of the image of the printed document can thereafter be retrieved.

In accordance with one aspect of the present invention, an image of a document can be automatically generated, and a signature related to the image can be generated and stored within a data store upon printing of the document. This ensures that for every printed document there exists a signature that relates to a stored electronic version of such document within a designated data store. Thus, a document can be created, and a bitmap (or other suitable image format) can automatically be generated upon printing of the document. A signature that identifies the document can be generated and stored within a data store upon generation of the image of the electronic document. Thereafter, the document can be modified and printed again, resulting in automatic generation and storage of a signature related to the modified document without altering the signature related to the original document. Signatures that represent word-layout of the electronic documents can then be compared with a signature of a later-captured image of a printed document, and the electronic version of the document related to the signature that most substantially matches the signature of the later-captured image can be retrieved.

Difficulties can arise, however, in matching a printed document to an electronic version of the document when the printed document contains a plurality of annotations, stains, folds, and other physical modifications. Thus, the present invention locates and removes such physical modifications prior to utilizing word layout of the document to generate a signature. Filters that remove annotations, markups, and other noise are provided in connection with the present invention. Moreover, a grayscale image of the captured image of the printed document can be generated to reduce noise. For example, given a particular lighting, an image of a document with white background and black lettering can appear to have a yellow background and green lettering. Grayscaling the image can effectively mitigate problems that can occur when images do not comprise appropriate colors.

In accordance with another aspect of the present invention, signatures of electronic documents and/or a signature of an image of a printed document can comprise a threshold tolerance for rotation and/or translation that can occur when obtaining an image of the printed document. For example, a printed document may not be aligned precisely within a scanner (e.g., the image of the document can be translated and/or rotated with respect to the image boundary). If such error is not accounted for, then it is possible that a signature of the image of the printed document will not substantially match a signature of a corresponding electronic document. Thus, accounting for error that can occur when capturing an image of a printed document ensures that a corresponding electronic document can be located and retrieved.

The present invention also addresses concerns that may arise related to an amount of time required to compare numerous signatures of electronic documents with a signature of an image of a printed document. For example, if a data store included thousands of documents or images of documents, an amount of time greater than a desirable amount of time may be required to fully compare signatures related to the documents or images. To alleviate such concerns, the present invention provides a system and/or methodology to quickly reduce the number of electronic document signatures to consider. Tree representations of the documents can be generated, wherein the tree representations are a hierarchical representation of an image based upon whether particular segments of the image include one or more words. For example, an image can be partitioned into a plurality of segments, and a value can be associated with such segments that can be utilized to inform a comparison component whether the segments include one or more words. Those segments can thereafter themselves be partitioned into a plurality of segments, and each segment can be associated with a value that is utilized to inform a comparison component whether the segments include one or more words. A tree representation related to an image of a printed document can thereafter be compared to tree representations related to electronic versions of a plurality of documents. These tree representations are less complex than signatures, and can be utilized to quickly reduce a number of signatures that remain under consideration in connection with locating an electronic version of a document based at least in part upon a captured image of a printed document.

In accordance with another aspect of the present invention, the signatures of the electronic documents can be partitioned into a plurality of segments, and the signature of the image of the printed document can be similarly partitioned. Thereafter, a segment of the signatures of the stored electronic documents can be compared with a corresponding segment of the signature of the image related to the printed document. In accordance with one aspect of the present invention, the signatures can be hash tables, and if the compared segments have one match (or a threshold number of matches), the entire hash table is kept for further consideration. Thus, every line of the segment does not need to be compared, much less every line of the entire hash table. Hash tables of the electronic documents whose segments do not have a match or threshold number of matches with the corresponding segment of the hash table related to the printed document are discarded from consideration. When a number of hash tables remaining under consideration reach a threshold, a more thorough comparison between the remaining hash tables and the hash table related to the printed document is completed. A confidence score can be generated for each remaining hash table (e.g., a point can be awarded for each matching line, and a total number of points can be summed), and if a confidence score for one or more of the hash tables is above a threshold, the electronic version of the document related to the hash table with the highest confidence score can be returned to a user via a hyperlink, URL, or other suitable method. If a hash table with a confidence score above a threshold does not remain, discarded hash tables can be reconsidered for a different segment or combination of segments. While the above example states that hash tables can be utilized as signatures, it is to be understood that any data structure that can be stored and act as a signature for an electronic document can be employed in connection with the present invention.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

DETAILED DESCRIPTION OF THE INVENTION

Figure 1:
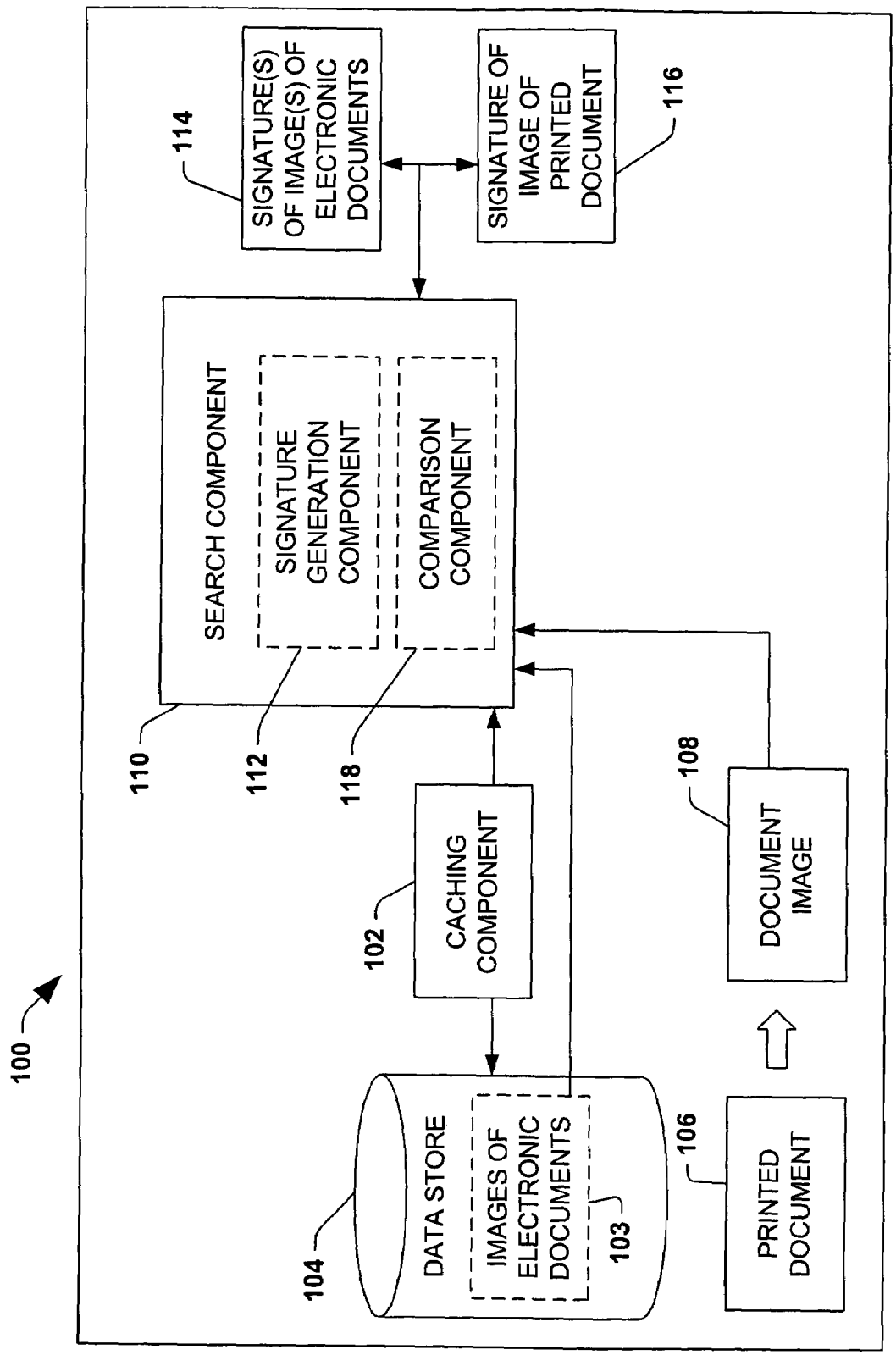
FIG. 1 is a block diagram of a system that facilitates indexing and/or retrieval of an electronic document in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Turning now to FIG. 1, a system 100 that facilitates automatic indexing and/or retrieval of an electronic version of a document based at least in part upon a digitized image of a printed document is illustrated. It is to be understood that the electronic document can originate from a word-processor or other similar typing application, or alternatively originate from a pen and touch-sensitive screen. The system 100 enables matching of a printed document with an electronic version of such document via utilizing topological properties of words that appear within the document. The system 100 includes a caching component 102 that facilitates generating an image 103 of an electronic document that is resident in a data store 104. The image 103 of the electronic version of the document is stored in the data store 104 to enable later retrieval of such image as well as other associated data (e.g., the electronic version of the document, a URL that links that identifies a location of the electronic version of the document, a tree representation (described in more detail infra), . . . ). For example, the caching component 102 can be a print driver that automatically generates the electronic image 103 of a document when a user prints such document, and thereafter relays the image 103 of the electronic version of the document to the data store 104. Thus, at a substantially similar time that the document is printed, a bitmap of the document (or other suitable file format) is generated via the caching component 102, and the image 104 of the electronic version of the document and/or other associated information is stored within the data store 104. In accordance with another aspect of the present invention, a user interface can be provided that enables a user to select particular documents of which to generate an image. For instance, a component can be provided that enables a user to toggle on and/or off an automatic image generation feature of the cache component 102 (e.g., similar to a "print to file" print option).

Thus, the data store 104 will include a plurality of images 103 of electronic documents, wherein each image of an electronic document corresponds to at least a portion of a document 106 that has been previously printed. For example, each image 103 can correspond to an individual page of the document 106. In an instance that the printed document 106 contains no explicit information that informs a user of an identity of such printed document 106, the system 100 can be employed to locate the corresponding image(s) 103 within the data store 104. For example, the printed document 106 could be distributed at a meeting, and an attendee of the meeting may desire to locate an electronic version of the document to add modifications. Similarly, a user may have made various annotations on the printed document 106, and may simply desire to obtain a version of the document 106 that does not comprise such annotations. A digital image 108 of the printed document 106 can be obtained via a scanner, digital camera, or other suitable device. Upon receiving the digital image 108, a search component 110 searches the data store 104 to locate the corresponding images 103 of the electronic version of the printed document 106.

The search component 110 includes a signature generation component 112 that receives the images 103 generated via the caching component 102 and facilitates creation of signature(s) 114 relating to each electronic image 103 generated via the caching component 102. The signature generation component 112 also receives the digital image 108 and generates a signature 116 relating thereto. In accordance with one aspect of the present invention, the signature generation component 112 can generate the signature(s) 114 for the images 103 of electronic documents as they are being stored in the data store 104 (e.g., the caching component 102 can relay the digital images 103 to the signature generation component 112 at a substantially similar time that the images 103 are relayed to the data store 104). Such an embodiment would have an advantage of reducing time required to search the data store 104, as the signature(s) 114 would previously be generated and processing time required to generate the signature(s) 114 would not be necessary. In accordance with another aspect of the present invention, the signature generation component 104 can generate the signature(s) 114 each time the data store 104 is loaded. This exemplary embodiment would preserve storage space within the data store 104, as it would not be necessary to continuously allocate memory for the signature(s) 114 of the stored images 103 of electronic documents. From the foregoing exemplary embodiments it is to be understood that the signature generation component 112 can be employed to generate the signature(s) 114 for the images 103 of electronic documents at any suitable time upon receiving an image via the caching component 102, and the above exemplary embodiments are not intended to limit the scope of the invention.

The signature generation component 112 generates the signatures 114 of the images 103 of electronic documents within the data store 104 based at least in part upon topological properties of words within the images 103 of electronic documents. For example, geometries of words can be employed to generate a signature of a document comprising such words. Generating the signature(s) 114 based upon word topological properties is an improvement over conventional systems because words typically do not collide with disparate words at low resolution (while individual characters are more likely to merge at low resolution). Furthermore, less time is required to generate such signature(s) 114 based upon word topological properties in comparison to character properties, while accuracy is not compromised for the improvements in expediency obtained via utilizing the present invention. Accuracy is not negatively affected due to a substantially small probability that two disparate documents will have a substantially similar layout of words.

Topological properties of words within the images 103 of electronic documents can be obtained by dilating the electronic images 103 generated via the caching component 102, thereby causing characters of words to merge without causing disparate words to collide. Dilating the images refers to any suitable manner for causing characters of a word to merge without causing disparate words to merge. For instance, resolution of the images 103 can be altered until individual characters of words connect with one another. More particularly, the generated images can be binarized, and connected components within words can be computed. Thereafter, such connected components are dilated to join characters within words. In accordance with one aspect of the present invention, upon dilating the images generated via the caching component 102, signature(s) 114 are generated based upon geometric properties of the resulting word blocks in the images 103. For example, pixels of the images 103 can be viewed as X-Y coordinates, and word location can be defined based on such coordinates (pixels). In order to minimize processing time required for the signature generation component 112 to generate the signature(s) 114, a word location within an image can be defined by an X-Y coordinate at a particular geometric location of such word. For instance, a position of each word can be defined by an X-Y location at a particular corner of the words (e.g., an X-Y location can be determined for an upper-left corner of each word). Width of the words can also be employed to further define word layouts of disparate documents. Therefore, in accordance with one aspect of the present invention, the signature generation component 112 can generate the signature(s) 114 based at least upon an X and Y coordinate of words within the images 103 and widths W of the words. For example, one or more functions can be employed to generate a signature relating to an image based upon X, Y, and W coordinates of words within the image. More particularly, the signature generation component 112 can generate a hash table for each image 103 of an electronic document within the data store 104 via utilizing X, Y, and W coordinates for words within the images of electronic documents 103. However, it is to be understood that the signature generation component 112 can be employed to create any suitable signature(s) 114 that can be employed to distinguish disparate images and/or search for and retrieve an image substantially similar to the printed document 106.

In accordance with another aspect of the present invention, the signature generation component 112 can account for error that may occur when generating the signature(s) 114 for the images 103 of electronic documents in the data store 104. For example, if the printed document 106 is scanned or photographed by a digital camera, the resultant image 108 can be translated and/or rotated in comparison to a corresponding electronic image of the document 106 within the data store 104. To illustrate one exemplary manner in which the signature generation component 112 can account for translation and/or rotation error, a threshold amount of error can be accounted for when employing X, Y, and W coordinates to generate the signature(s) 114. More particularly, arrays [X+c, X−c], [Y+d, Y−d], and [W+e, W−e] can be employed to generate a signature, wherein X and Y illustrate a position of at least a portion of a word, W is a width of the word, c is an error tolerance in an x-direction, d is an error tolerance in a y-direction, and e is an error tolerance for width of the word. Thus, any combination of values within the arrays can indicate a position and width of a word (e.g., (X+c, Y−d, W+e) could indicate a position and width of a word with actual position and width of (X, Y, W)). Therefore, the signature generation component 112 can utilize word-level topological properties to generate the signature(s) 114 for images 103 of electronic documents stored within the data store 104 while accounting for possible errors that can occur in obtaining the digital image 108 of the printed document 106. In accordance with another aspect of the present invention, a pre-processing technique can be employed to mitigate translation and/or rotation inherent within the digital image 108. More particularly, translation can be mitigated via determining a median center of all words (e.g., connected components), and a desirable horizontal direction can be located by projecting connected components until entropy is sufficiently minimized. Furthermore, a match in horizontal direction can be completed at 180 degrees to further limit rotation and/or translation error.

The signature generation component 112 can create the signature 116 of the digital image 108 of the printed document 106 in a substantially similar manner that the signature (s) 114 are generated. Resolution of the digital image 108 can be altered if necessary to enable the signature generation component 112 to obtain word-level topological properties of the digital image 108. For example, resolution of the digital image 108 can be altered and a location of a particular portion of a word (e.g., an upper-left corner) within the digital image 108 can be defined by X and Y coordinates. A width of the word W can then be utilized to further define the word. Thus, X, Y, and W values can exist for each word in the digital image 108, and the signature generation component 112 can create a signature of the image 108 based at least in part upon the X, Y, and W values of the words within the digital image 108. As possible translation and/or rotation error has previously been accounted for in the signature(s) 114 of images generated via the caching component 102, it may not be necessary to further account for such errors in the signature 116. However, the present invention contemplates accounting for possible error in both signatures 114 and 116, accounting for possible error in either signature 114 and 116, and not accounting for error in either signature 114 and 116. In accordance with another aspect of the present invention, a signature of rotated documents can be generated and stored within the data store 104. For example, when signatures related to the images 103 of electronic documents are generated and stored, the signature generation component 112 can generate a signature as if the document were rotated and/or translated.

After the signatures 114 and 116 have been created by the signature generation component 112, at least a portion of one of the signature(s) 114 relating to an electronic document stored within the data store 104 should substantially match the signature 116 relating to the digital image 108 of the printed document 106. The search component 110 includes a comparison component 118 that receives the signature 116 and the signature(s) 114 and compares the signature 116 with the signature(s) 114. For instance, if the signature(s) 114 and 116 are hash tables, the comparison component 118 can count a number of matches between entries of hash tables corresponding to cached images and a hash table corresponding to the digital image 108. The comparison component 118 can then return an electronic document relating to the signature 114 with a greatest number of matches to the signature 116. Alternatively, the comparison component 118 can return a document relating to the signature 114 with a highest percentage of matches within a particular portion of the signature 116 (e.g., part of the printed document 106 can be torn, and percentage of matching between portions of the signatures can be indicative of a best document). Moreover, if insufficient information exists in the signature 114, the comparison component 118 can inform a user of such lack of adequate information.

In accordance with one particular aspect of the present invention, the comparison component 118 can perform a multi-tiered comparison of the signature(s) 114 with the signature 116. Such multi-tiered searching can be beneficial when a significant amount of images of electronic documents are stored within the data store 104. For instance, only a portion of the signature(s) 114 can be compared with a substantially similar portion of the signature 116. If any matches exist between such portions of signature(s) 114 and 116, then those signature(s) 114 are kept for further consideration. Signature(s) 114 that do not have a match 116 within the portion are excluded from further consideration. Thereafter, a smaller portion of the signature(s) 114 can be compared with a significantly similar portion of the signature 116, and any signature(s) 114 containing a match to the signature 116 within that small portion will be considered, while those signature(s) 114 not containing a match to the signature 116 will be excluded. Partitioning of the signature(s) 114 and 116 can be repeated until a threshold number of signature(s) 114 remain. Thereafter, the comparison component 118 can determine which of the remaining signature(s) 114 contains a highest number and/or a highest percentage of matches to the signature 116. In accordance with another aspect of the present invention, an electronic document relating to the signature 114 with the highest number and/or highest percentage of matches to the signature 116 will be returned to a user. For example, an electronic version of the document that existed at a time that the document was printed can be returned to the user. Moreover, a URL and/or return path can be provided to the user to enable such user to obtain the electronic version of the document that existed at a time when the document was printed.

In accordance with one aspect of the present invention, the data store 104 can be employed to at least temporarily store the images 103 of electronic documents as well as other data associated with the images 103. For example, that data store 104 can conceptually be a relational database, wherein page images related to pages printed by a user can be considered as the primary entities. A plurality of disparate data can thereafter be associated with the images 103, such as the signatures of the images 114, a hierarchical tree representation of the images 103 (described in detail infra), a URL that identifies a location of an electronic version of a document corresponding to one of the images 103, an electronic version of a document that existed at a time a corresponding image 103 was printed (e.g., which may be desirable in an instance that such document has been since modified), and other suitable information. Other embodiments, however, are contemplated by the present invention and intended to fall within the scope of the hereto-appended claims. For example, storage space may be at a premium, and it can become expensive to permanently store an electronic image of each page printed. In such an instance, the electronic images 103 can be generated and temporarily stored to enable generation of the signatures 114. Thereafter the signatures 114 can be the primary entities and be associated with URLs or other information that can be employed to obtain an electronic version of the document (or image of the document).

Figure 2:
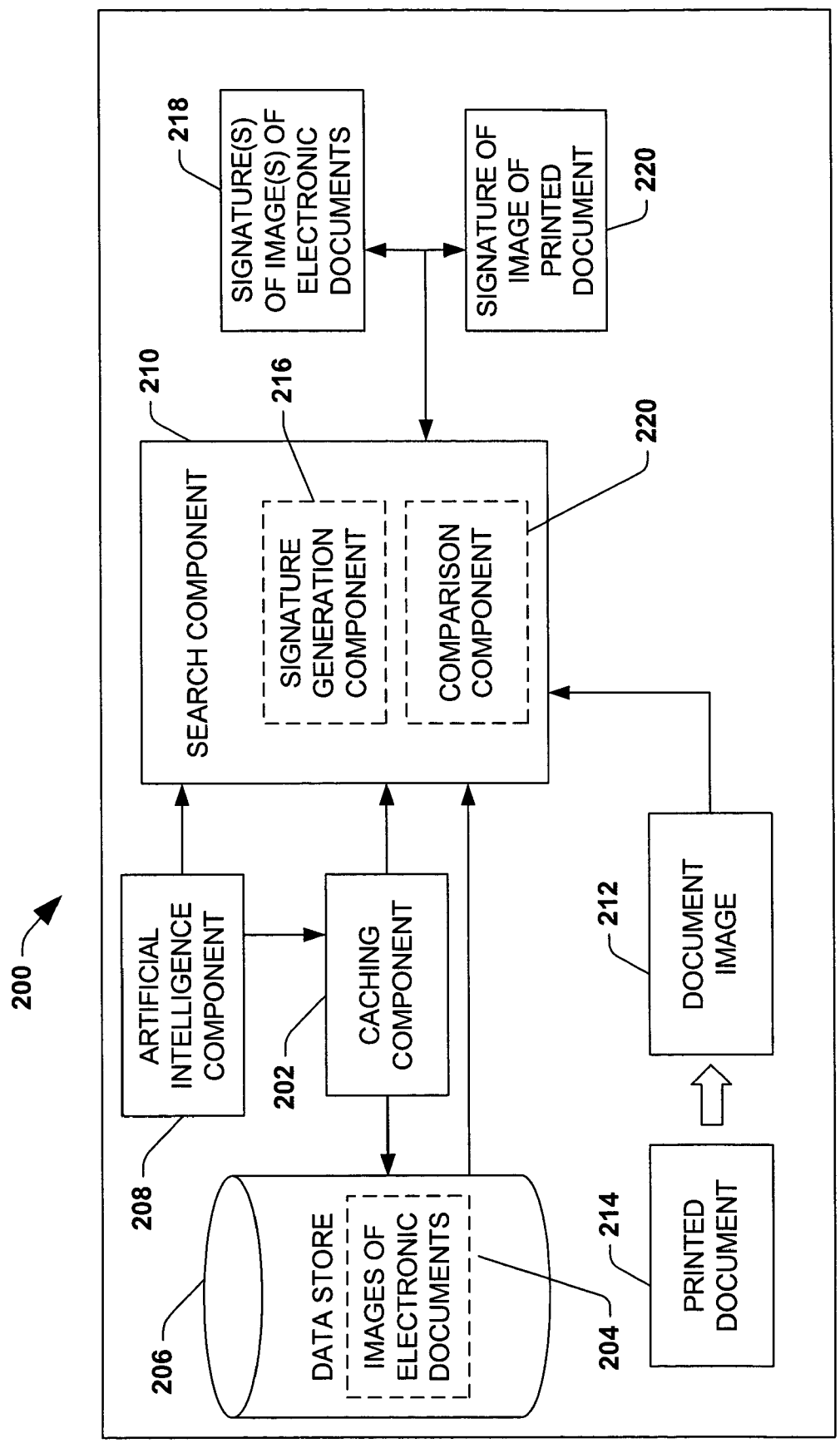
FIG. 2 is a block diagram of a system that facilitates indexing and/or retrieval of an electronic document in accordance with an aspect of the present invention.

Turning now to FIG. 2, a system 200 that facilitates automatic indexing and/or retrieval of an electronic version of a printed document that existed at the time the document was printed based at least in part upon a later-obtained image of such printed document is illustrated. The system 200 includes a caching component 202 that automatically generates electronic images 204 of electronic documents and relays such images 204 to a data store 206. In accordance with one aspect of the present invention, the caching component 202 can generate a digital image 204 of a document and store the image 204 at a substantially similar time that a document is printed. Thus, at least a portion of each printed document (e.g., each page of every printed document) can have a correlating image 204 within the data store 206. The caching component 202 can also generate a digital image 204 of each electronic document stored within the data store 206 or in other storage locations within a computer. An artificial intelligence component 208 can also be employed in connection with the caching component 202 to determine which electronic documents should have images 103 of such documents generated via the caching component 202. For example, the artificial intelligence component 208 can infer which electronic documents should have images relating thereto generated.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

For example, the artificial intelligence component 208 can watch a user over time as to "learn" which documents are typically cached by the user given a particular user state and context. More particularly, the artificial intelligence component 208 can infer that a user only wishes to generate images of documents created and/or saved in a particular program (e.g., Microsoft Word®). In another example, the artificial intelligence component 208 can "learn" that a user only desires to generate images of documents printed at particular times and/or days, or that the user only desires to generate images of documents with a particular naming convention. Thus, the artificial intelligence component 208 can reduce an amount of storage space required within the data store 206, as well as reduce time required to search the data store 206 (e.g., as there are less images 204 of electronic documents to search).

A search component 210 is provided that facilitates searching the data store 206 for an image 204 of an electronic document that is substantially similar to a digital image 212 of a printed document 214. The search component 210 includes a signature generation component 216 that receives the generated images and creates signatures 218 of the generated images, as well as receives the digital image 212 of the printed document 214 and generates a signature 220 relating thereto. The signatures 218 and 220 are generated based upon word-level topological properties. For example, resolution of the images 204 generated via the caching component and the digital image 212 can be altered to cause characters of words to merge without causing disparate words to merge. Thereafter, each word can be identified by X-Y coordinates within the image and a width of each word. These coordinates can be utilized by the signature generation component 216 to generate a signature related to each image 204 of an electronic document within the data store 206, as well as a signature 220 that is substantially similar to a signature related to one of the images 204 of electronic documents. Moreover, the signatures 218 and/or the signature 220 can account for translation and/or rotation errors that can occur when digitizing the printed document 214. The signature generation component 216 can also utilize the aforementioned coordinates and width in connection with one or more functions to generate hash tables that act as the signatures 218 and/or 220.

In accordance with another aspect of the present invention, the artificial intelligence component 208 can operate in connection with the signature generation component 216 to determine particular electronic documents for which the caching component should store images 204 in the data store 206 and for which the signature generation component 216 should generate signatures 218. For example, given a particular user state and context, the artificial intelligence component 208 can infer that only a subset of printed electronic documents should have corresponding images 204 stored and signatures generated. More particularly, a user may typically attempt to index and/or retrieve electronic documents generated in particular processing programs. Thus, the artificial intelligence component 208 can inform the caching component 202 and signature generation component 216 to only process electronic documents created in such processing programs.

After the signature generation component 216 generates the signatures, a comparison component 222 receives the signatures 218 and 220 and compares the signatures 218 related to the images 204 of the electronic documents with the signature 220 of the digital image 212. The signature from the signatures 218 that most substantially matches the signature 220 of the digital image 212 is located by the comparison component 222, and the electronic document corresponding to such signature is returned to the user. For example, the comparison component 222 locates an image 204 of an electronic document within the data store 206 that most closely matches the digital image 212 of the printed document 214 via comparing their corresponding signatures 218 and 220. Thereafter a URL and/or other information associated with the most closely matching image 204 can be obtained and returned to the user. A URL and/or other information informing the user of the location of an electronic version of the document can be returned to the user during instances that the electronic version of the document is not stored within the data store 206. In instances that the electronic version of the document is stored within the data store 206, such document can be directly relayed to the user. In accordance with one aspect of the present invention, the comparison component 222 can employ a multi-tiered comparison technique to locate a signature of the signatures 218 that most substantially matches the signature 220. For instance, only portions of the signatures 218 can be compared against a substantially similar portion of the signature 220. Smaller and smaller portions of the signatures 218 and 220 can be compared until a threshold number of the signatures 218 remain for consideration. Thereafter, the remaining subset of the signatures 218 can be compared in full against the signature 220. Alternatively, the remaining subset of the signatures 218 can be randomly spotchecked against the signature 220 (e.g., random portions of the remaining subset of signatures 218 can be compared against substantially similar random portions of the signature 220).

Figure 3:
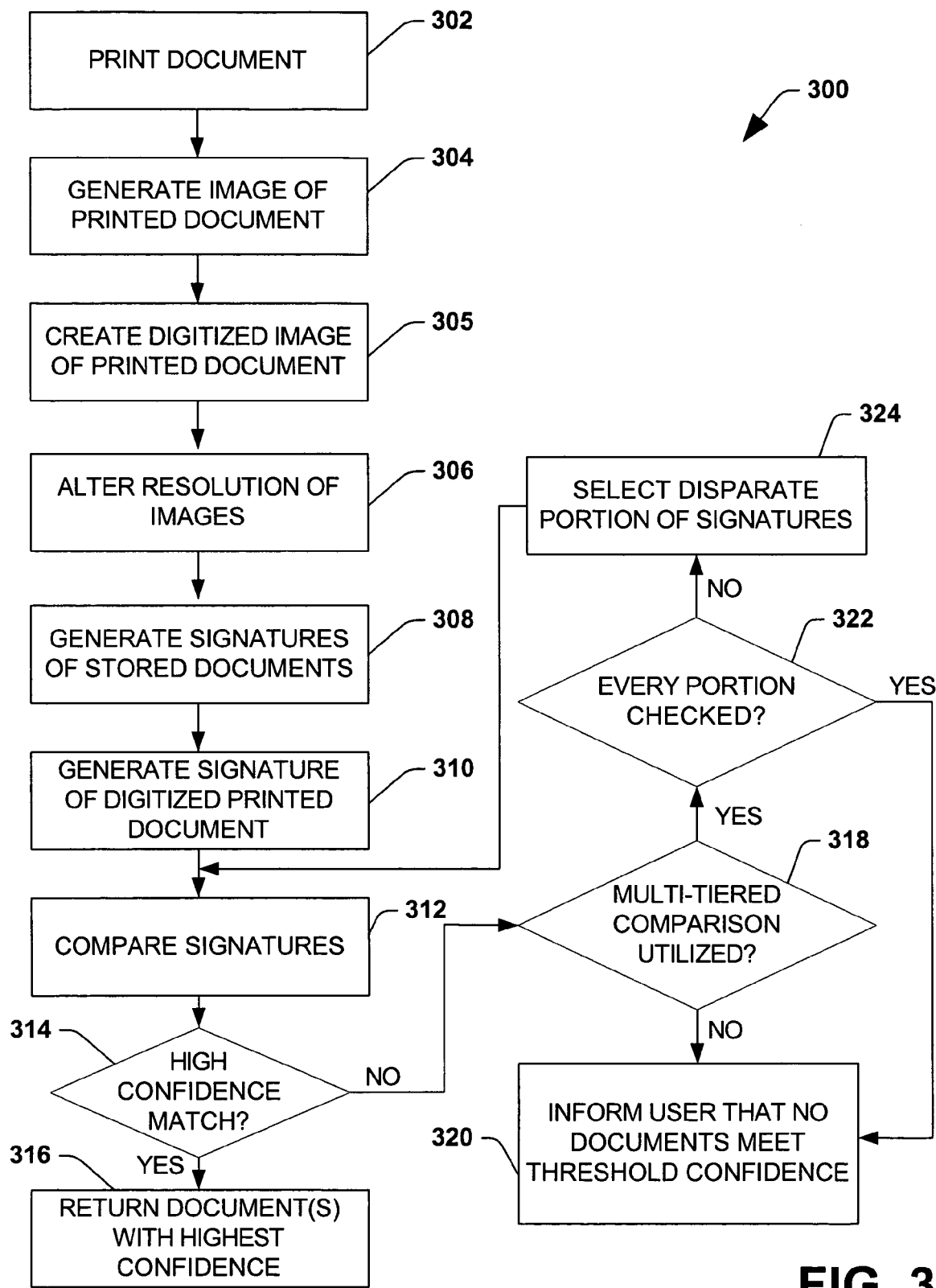
FIG. 3 is a representative flow diagram that illustrates a methodology that facilitates indexing and/or retrieval of an electronic document in accordance with one aspect of the present invention.

Referring now to FIG. 3, a methodology 300 for automatically indexing and/or retrieving a stored electronic document based at least in part upon a digital image of a printed document is illustrated. While, for purposes of simplicity of explanation, the methodology 300 is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 302, a hard copy of a document is printed. At 304, an image of at least a portion of the printed document is generated. For example, a number N images can be generated for a document with N pages, wherein each page has an image associated therewith. In accordance with one aspect of the present invention, a print driver can be employed to automatically generate the image(s) of a document as it is being printed (e.g., similar to a "print to file" option). Furthermore, images of each electronic document can be generated and stored prior to a document being printed. Thus, for any document printed, there will exist a corresponding digital image within a data store. At 305, a digital image of the printed document is created. For example, a digital camera or a scanner can be employed to generate a digital image of a printed document. At 306, resolution of the generated digital image(s) and resolution of the digital image(s) of the printed document obtained via a digital camera or scanner are altered to facilitate use of word-level topological properties in connection with matching the digital image of the printed document to one of the images of electronic documents within the data store. For instance, the images can be dilated, thereby causing individual characters to merge together without causing disparate words to connect. If resolution of the image captured by the digital camera or scanner already has sufficiently low resolution, no adjustment in resolution will be required.

At 308, a signature is generated for each generated image stored in the data store, wherein the signatures employ word layouts of the images to ensure that such signatures are unique. For example, a location of a particular portion of each word (e.g., a corner) can be defined by X-Y coordinates of such portion of the words. Moreover, width of the words can also be employed to further define word layout of each document. As a probability of two disparate documents having an identical word layout is substantially small, these X, Y, and width values that define word layout can effectively be employed to generate a signature that identifies each document. In accordance with one aspect of the present invention, the generated signature can be a hash table. Hash tables can be desirable due to flexibility in size and an ability of a user to determine an efficient trade-off between speed of matching and robustness of matching. Moreover, a threshold amount of error can be defined, and the generated signature can account for such error. For instance, translation and/or rotation errors can occur when capturing a digital image of a printed document (e.g., photographing a document with a digital camera). Accounting for such possible error in the signatures of the captured documents ensures that such error will not prohibit location of a particular image in the data store that substantially matches the digital image of the printed document.

At 310, a signature of the image of a printed document is generated. Such a signature is generated in a substantially similar manner that the signatures of the stored images were generated at step 308. Such consistency in signature generation provides for optimal efficiency in both signature generation and/or signature matching. For instance, if the signatures of the stored images are hash tables, the signature of the digital image can also be a hash table to enable efficient comparison between such hash tables. Furthermore, as translation and/or rotation error has been accounted for in the signatures of the stored images, it may not be desirable to account for such errors again in the signature of the digital image of a printed document.

At 312, the signatures generated at 308 and 310, respectively, are compared to determine a signature of the electronic document that most closely matches the signature of the digital image of the printed document. For example, if the signatures are hash tables, each entry of a hash table relating to the image of the printed document can be compared with each entry of every hash table relating to the stored images. Thereafter, the hash table of the stored image with the highest number of matches to the hash table of the digital image of the printed document can be utilized to return the electronic document relating to such hash table to the user. More particularly, a stored image of an electronic document that most closely matches an after-acquired image of a printed document can be located via comparing their signatures. Thereafter a URL or other suitable mechanism that identifies a location of the electronic document can be obtained and returned to the user. Line-by-line matching in hash tables, however, can require a substantial amount of time if numerous images are stored within the data store (and thus numerous signatures relating to such images exist). Thus, in accordance with another aspect of the present invention, a portion of the signature of the digital image of the printed document can be compared with a substantially similar portion of the signatures related to images of electronic documents within the data store. Thereafter any signatures of the images of electronic documents that have one or more matches to the signature of the digital image of the printed document within the portion are kept for further consideration, while the signatures of the stored images that do not have a match to the signature of the digital image of the printed document are not further considered. Thereafter a repeatedly smaller portion of the signatures can be compared in a substantially similar manner to effectively reduce a number of signatures considered until a pre-defined threshold number of signatures remain. Such remaining signatures can be thoroughly compared with the signature of the digital image of the printed document.

Moreover, an exclusionary search can be utilized to expedite locating an electronic version of a printed document based upon a printed version of the document. For instance, a tree representation can be generated corresponding to images generated from electronic documents as well as for the captured image of the printed document. More particularly, each image (generated and stored images and the captured image) can be divided into a discrete number of segments. Thereafter, each segment that includes a word can be given a value (e.g., one) and each segment that does not include a word can be given a disparate value (e.g., zero). Each segment can be further partitioned into smaller segments, and again each segment that includes a word is assigned a value and each segment that does not include a word can be assigned a different value. Each segment can be further partitioned until a desirable number of segments has been created, wherein each segment is assigned a value depending on whether a word exists within the segment. Thus a hierarchy is generated, wherein each segment is associated with a particular level within the hierarchy. For example, the entire document would be on a top level of the hierarchy, a first segmentation would be related to a second level of the hierarchy, a second segmentation would be related to a third level of the hierarchy, etc. This tree representation can be generated and stored at a substantially similar time that a signature relating to an image is generated. Prior to comparing signatures, the tree representations related to the electronic documents and the captured image of the printed document can be compared to quickly discard stored images of electronic documents that cannot match the image of the printed document. For example, if a segment of the captured image includes a word and a corresponding segment of a generated/stored image does not include a word, the generated/stored image can be discarded from further consideration. It is to be understood, however, that generated/stored images are not discarded when a segment of a generated/stored image includes a word and a corresponding segment of the captured image does not include a word, as a printed document may be partially torn, for instance, and a segment that would have otherwise included a word is not reflected in the captured image due to such tear. By utilizing the tree representations of the images (generated and captured), a number of signatures to be considered for comparison can be reduced, thereby reducing time required to locate an electronic document based upon a captured image of such document.

At 314 a determination is made regarding a confidence of a match between at least a subset of signatures stored in a data store and the signature relating to the digital image of the printed document. If a high confidence match exists, then an electronic document corresponding to the matching signature is returned to a user at 316. More particularly, a stored image of an electronic document that most closely matches an after-acquired image of a printed document can be located via comparing their signatures. Thereafter a URL or other suitable mechanism that identifies a location of the electronic document can be obtained and returned to the user. If there does not exist a match that is above a threshold confidence, at 318 a determination is made regarding whether multi-tiered comparison approach has been utilized to compare documents. If multi-tiered comparison has not been used, then at 320 a user is informed that there does not exist a high confidence match. If a multi-tiered comparison approach is utilized, a determination at 322 is made regarding whether every portion of the signatures related to the images of electronic documents in the data store have been compared with every valid portion of the signatures of the images of the printed document. Signatures of the images of the printed document can contain invalid portions (e.g., gaps in the signature resulting from physical damage and/or noise removal), thus it would not be beneficial to compare these invalid portions with signatures related to the images of electronic documents. If every portion has been checked, the user is informed that there does not exist a high confidence match at 320. Otherwise, at 324 a disparate portion of the signature can be utilized to compare signatures to ensure that no substantial match exists. Such an approach can be effective if a portion of the printed document has been torn upon printing, causing at least a portion of the signature of the printed document to not substantially match the corresponding portion of the signature related to the image of the electronic version of the printed document. Thus a disparate portion of the signatures can be selected to maintain efficiency in comparing signatures without requiring a substantial amount of time to compare such signatures. This disparate portion of the signature of the image of the printed document is then compared with the corresponding portion of the signatures related to the images of electronic documents at 312. If a high-confidence match is found, then at 316 the electronic document corresponding to the signature with the highest confidence match to the signature of the image of the printed document is returned to the user. More particularly, a stored image of an electronic document that most closely matches an after-acquired image of a printed document can be located via comparing their signatures. Thereafter a URL or other suitable mechanism that identifies a location of the electronic document can be obtained and returned to the user.

Figure 4:
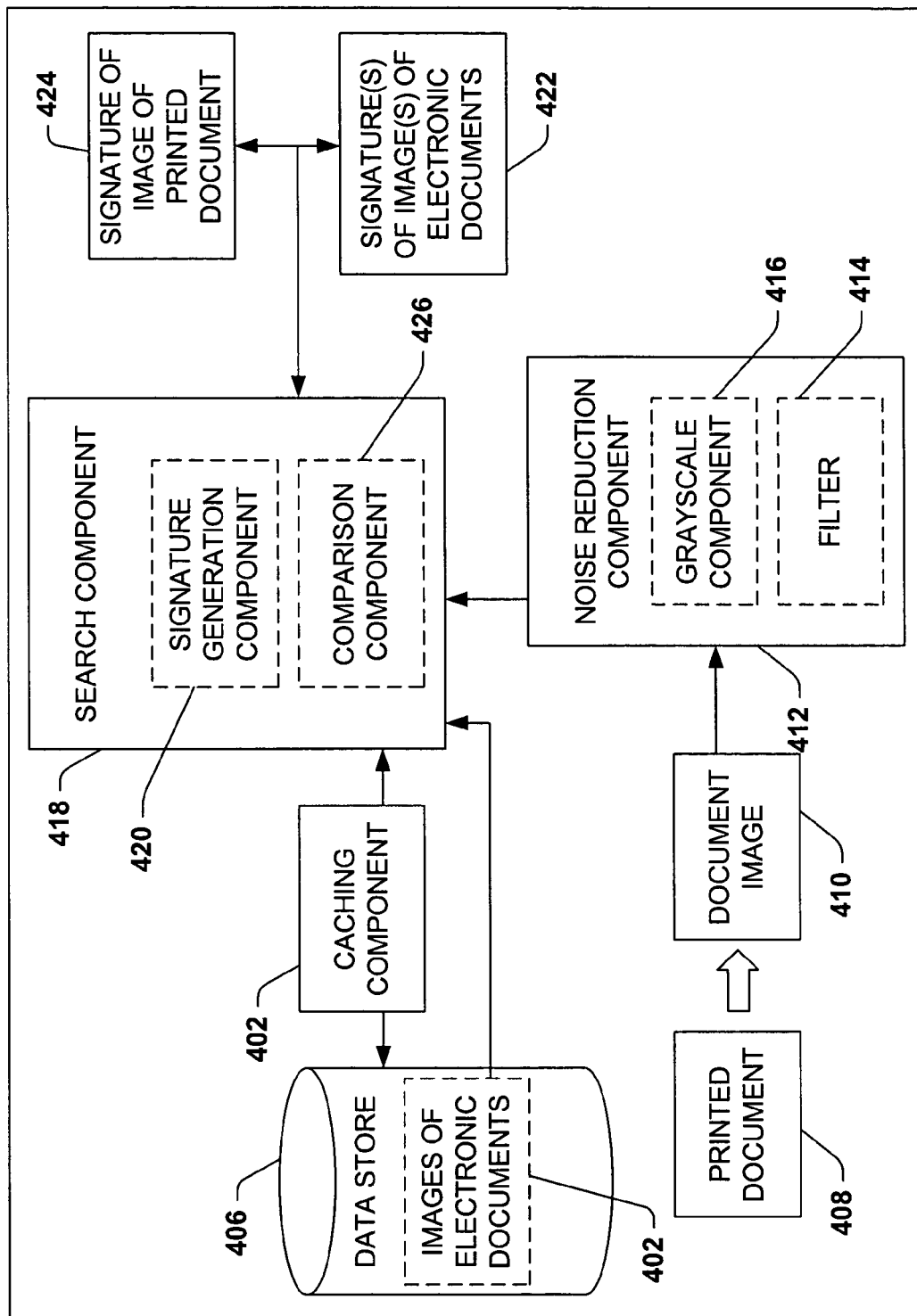
FIG. 4 is a block diagram of a system that facilitates indexing and/or retrieval of an electronic document in accordance with an aspect of the present invention.

Now referring to FIG. 4, a system 400 that facilitates automatic indexing and/or retrieval of an electronic version of a printed document based at least in part upon a captured image of the printed document is illustrated. The system 400 comprises a caching component 402 that automatically generates image(s) 404 of at least a portion of electronic document(s). For example, an image 404 can be generated for each page of an electronic document and subsequently stored in a data store 406. In accordance with one aspect of the present invention, the caching component 402 generates and stores the image(s) 404 of at least a portion of electronic document(s) whenever a document is printed. Thus, for every page of a printed document a corresponding image 404 of such page of the document will be generated and at least temporarily stored. These images 404 of the electronic version of the document 404 are stored within the data store 406. A digital camera, scanner, or other suitable mechanism can be utilized to create an electronic image 410 of at least a portion of the printed document (e.g., a page). A noise reduction component 412 receives the electronic image 410 and is provided to reduce undesirable markings and other noise existent in the electronic image 410. The noise reduction component 412 is associated with a filter 414 that removes unwanted markings that are not existent within the images 404 of the corresponding electronic document. For example, the filter 414 can facilitate removal of underlines, stray markings, and other similar annotations. Similarly, the filter 414 can search for particular colors in the electronic image 410 and remove lettering and/or markings of such colors. The noise reduction component 412 can also include a grayscale component 416 that automatically adjusts color of the documents to facilitate noise reduction. For instance, a document can be printed on a yellow paper, while the image 404 of such document has a white background. Thus, the grayscale component 416 can alter color(s) of the image 410 to ensure that they are consistent with the stored images 404.

After noise has been reduced from the electronic image 410 via the noise reduction component 412, a search component 418 can utilize such electronic image 410 to search the data store 406 and locate one of the images 404 of electronic documents that substantially matches the electronic image 410 (and thus substantially matches the printed document 408). The search component 418 includes a signature generation component 420 that receives the images 404 generated via the caching component 402 and creates signatures 422 relating thereto, wherein each of the images 404 of electronic documents is associated with a signature 422 that identifies such images 404. The signatures 422 are generated based upon word layout within the generated images 404. For example, a location and width of each word in the images 404 generated via the caching component 402 can be utilized by the signature generation component 420 to generate the signatures 422. The signature generation component 420 also receives the electronic image 410 of the printed document 408 and generates a signature 424 relating thereto. Thus, if there has not been substantial damage to the printed document 408, at least a portion of the signature 424 will substantially match at least a corresponding portion of one of the signatures 422 related to the images 404 of electronic documents within the data store 406. In accordance with one aspect of the present invention, the signature generation component 420 can account for translation and/or rotation error that can occur while obtaining the electronic image 410 of the printed document 408. Upon generation of the signatures 424 and 422, a comparison component 426 associated with the search component 420 can locate the images of an electronic document 404 corresponding to the printed document 408 by comparing the signatures 422 and 424. More particularly, the image 404 of an electronic document that most closely matches image 410 of the printed document 408 can be located via comparing their signatures 422 and 424. Thereafter a URL or other suitable mechanism that identifies a location of the electronic document can be obtained and returned to the user.

Figure 5:
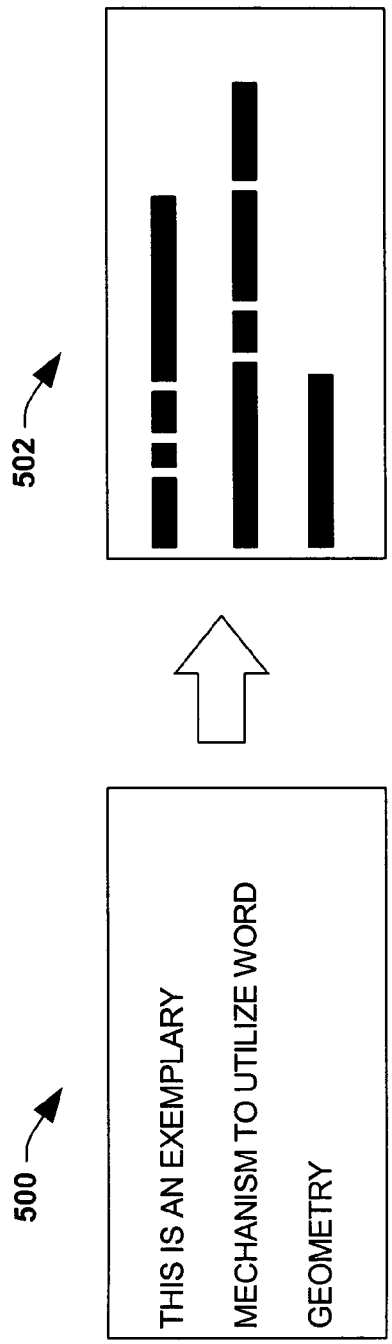
FIG. 5 illustrates an exemplary alteration of resolution of an image in accordance with an aspect of the present invention.

Turning now to FIG. 5, an exemplary dilation of an image 500 of a document is illustrated. The document 500 includes a plurality of words that comprise a plurality of characters. Conventional systems and/or methodologies utilize optical character recognition to facilitate matching of printed documents to a corresponding electronic image. However, a significant amount of time is required for such OCR, and when numerous electronic images require searching OCR can become overly burdensome. Thus, the present invention contemplates dilating the characters to merge such characters without merging the words. For instance, a resolution of the image 500 can be altered to cause such characters to merge. Thereafter, the image 500 will not comprise individual characters, but rather a layout 502 of the words. As a probability that two documents will comprise a substantially similar word layout is extremely small, a signature can be generated for the image 500 based on the word layout 502.

Figure 6:
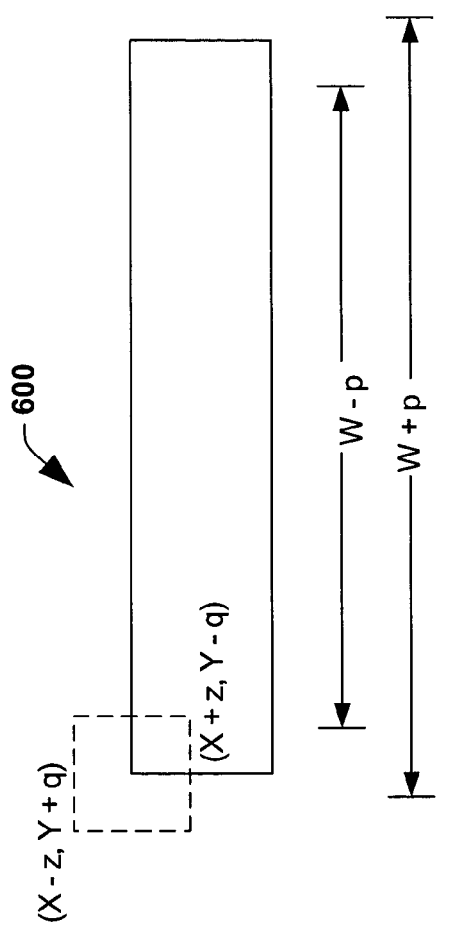
FIG. 6 illustrates defining word location and width and providing for error tolerance in such definition in accordance with an aspect of the present invention.

Now referring to FIG. 6, an exemplary word 600 comprising of a plurality of merged characters is illustrated. A position of the word 600 within the document can be defined by coordinates X, Y, and W, where X is a pixel location of a particular portion of the word 600 in the X-direction, Y is a pixel location of a particular portion of a word 600 in the Y-direction, and W is a width of the word 600. In accordance with one aspect of the present invention, the upper-left corner of the word 600 is utilized as the X, Y location that defines a location of the word 600. However, it is to be understood that any portion of the word 600 within a document can be utilized to define a location of the word 600 (e.g., lower-left corner, upper-right corner, center, . . . ).

In accordance with another aspect of the present invention, error in location can be accounted for by providing a threshold tolerance in an X, Y, and W direction. For example, X, Y, and W define a location of the word 600, and error tolerances of z in the X direction, q in the Y direction, and p in width, respectively, are provided. Thus, when such location is employed to generate a signature, the location can be defined as ([X−z, X+z], [Y−q, Y+q], [W−p, W+p]). However, if an image comprising the word 600 is a substantially high resolution, a number of pixels required for a satisfactory error tolerance can become too great (e.g., generating a signature for such high-resolution image can take a significant amount of time, and storing it can require a significant amount of space). Therefore, in accordance with another aspect of the present invention, resolution of the image can be altered to decrease the number of pixels within a physical boundary. Alternatively, one or more functions can be provided to effectively combine pixels to decrease a number of pixels within a physical boundary. A signature of a document comprising a plurality of words can be generated by utilizing X, Y, and W coordinates similar to that shown with respect to the word 600. Thus, a signature of an electronic image of a printed document can be compared with a plurality of signatures of cached images, and a signature substantially matching the signature of the printed document can be located and returned to the user.

Figure 7:
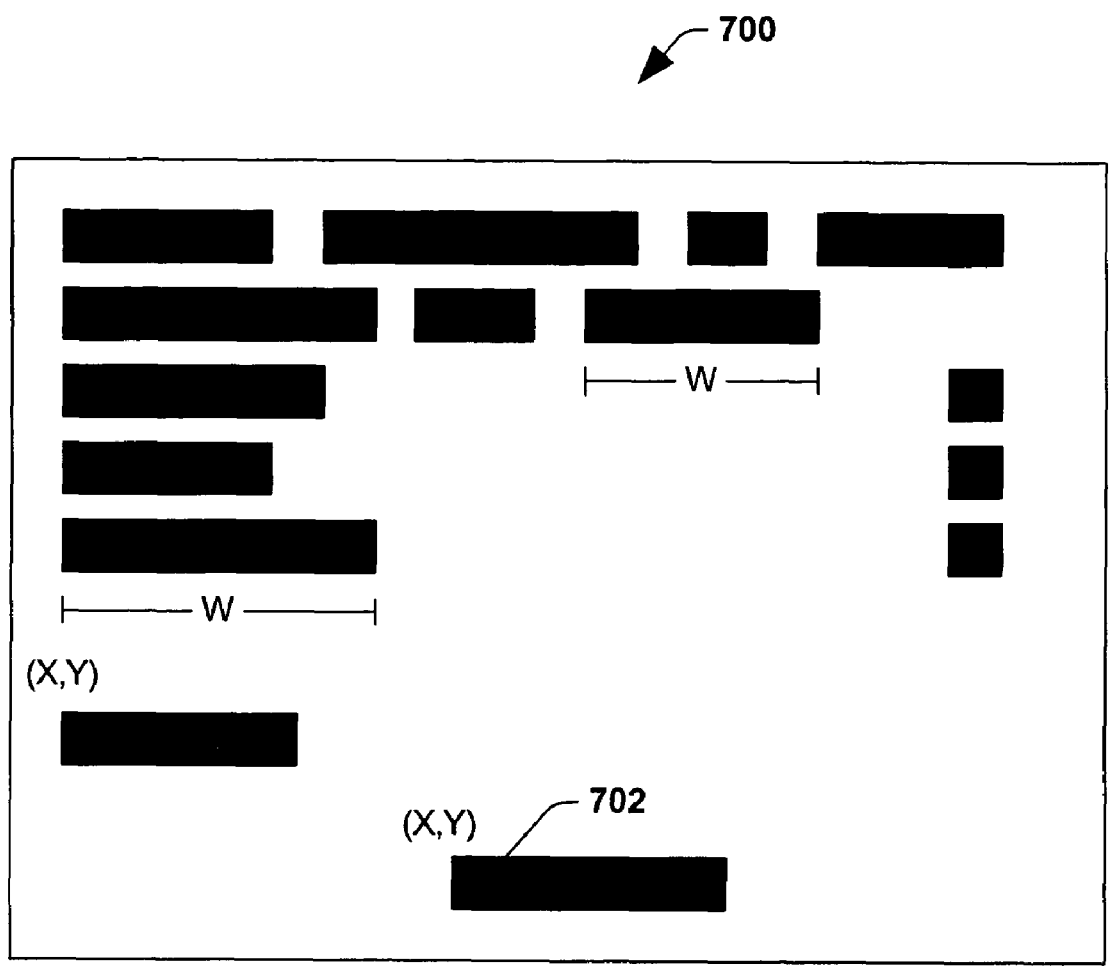
FIG. 7 is an exemplary image comprising a word layout in accordance with an aspect of the present invention.

Now referring to FIG. 7, an image 700 with an exemplary word layout is illustrated. The image 700 comprises a plurality of words 702, and a word layout can be defined by defining a location and width of each word within the image 700. Thereafter a signature can be generated via utilizing a word-layout of the image 700. For instance, the signature can be a hash table with values of "TRUE" corresponding to locations in the image 700 of words 702 in an X-direction, Y-direction, and width. More particularly, if a word location is defined by X=3, Y=4, and W (width)=7, then a location in the hash table corresponding to X=3, Y=4, and W=7 will have a value of TRUE. Moreover, error can be accounted for by providing for a tolerance with respect to X, Y, and W. For instance, if tolerances of z=q=p=2 were utilized, wherein z corresponds to a tolerance in X, q corresponds to a tolerance in Y, and p corresponds to a tolerance in W, then all hash table entries ([3−2, 3+2], [4−2, 4+2], [7−2, 7+2]) would be TRUE (e.g. (1, 2, 5), (2, 2, 5), (3, 2, 5), (4, 2, 5), . . . ) Thus, the image 700 can have a related signature that robustly identifies the image 700 via utilizing location and width of the words 702 with associated tolerances.

Figures 8, 9:
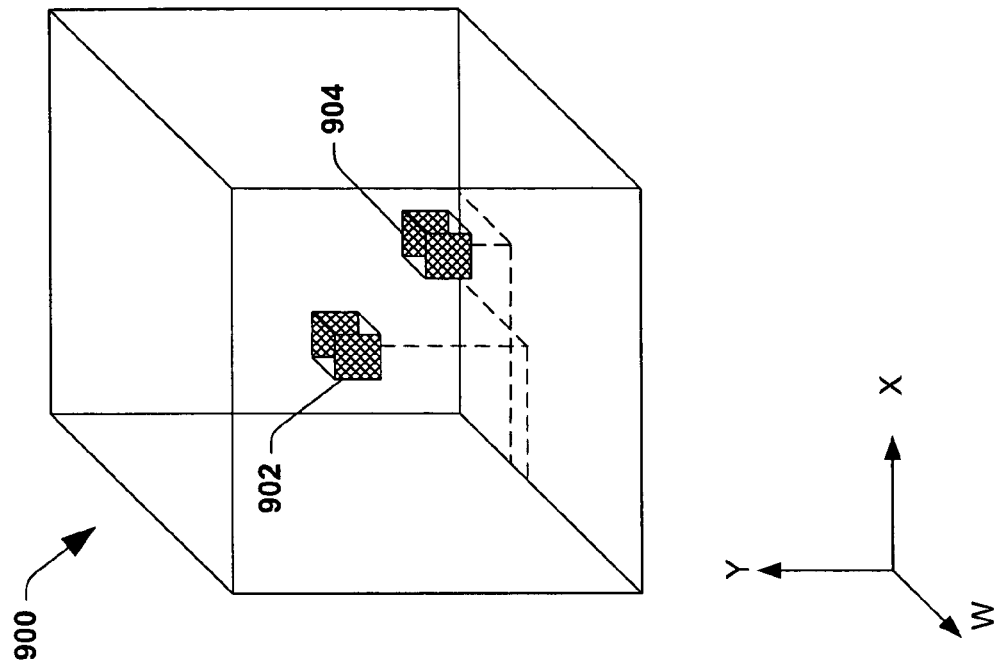
FIG. 8 is an exemplary hash table that can be utilized in connection with the present invention.
FIG. 9 is a three-dimensional view of the hash table of FIG. 8.

Now regarding FIG. 8, an exemplary hash table 800 that can be utilized as a signature for an image of a document is illustrated. A left column 802 represents locations within the hash table corresponding to locations on the image and widths of words within the image, and a right column 804 comprises "TRUE" and "FALSE" values associated with those locations. A value of "TRUE" indicates that a word is existent at the location and with a width indicated by a corresponding entry in the hash table 800, and a value of "FALSE" indicates that no word exists at the location and with a width indicated by a corresponding entry in the hash table 800 (e.g., a "TRUE" value can be indicated by a 1, and a "FALSE" value can be indicated by a 0). For example, a first row of the hash table 800 indicates that a word of width 16 does not exist at X-Y location (31, 21). The second row of the hash table 800 indicates that a word of width 17 does exist at X-Y location (31, 21). Moreover, the hash table 800 can be created in a manner to account for translation and/or rotational errors that can occur when obtaining an electronic image of a printed document. For instance, a word with width W=14 at location X=51, Y=17 can actually exist within an image. The hash table, however, can indicate that the word has a width of 13 through 15 at X=[50, 52] and Y=[16, 18]. Thus there can actually be a plurality of "TRUE" values in the hash table 800 relating to a single word (e.g., in the previous example, there will be 27 "TRUE" values for a single word).

In accordance with another aspect of the present invention, a function can be provided to condense the hash table 800 (e.g., the function can alter a resolution of an image represented by the hash table 800). For example, an upper-left corner of a word can have a location defined by pixels (161, 112), and the word can have a width of 54, wherein 161 represents a pixel location in an x-direction, 112 represents a pixel location in a y-direction, and the width of the word is in pixels. The pixel locations and width can thereafter be divided by a value (gridsize) to condense and/or expand the hash table

800 (e.g., a plurality of pixels can be identified by a single coordinate). Thus, if gridsize equals 5, then a location of the word correlating to (161, 112) can be defined by $$\left(\frac{161}{5}, \frac{112}{5}\right).$$

A width of the word can also be reduced by the same factor, or alternatively a disparate factor. For instance, a width reduction value (widtherr) can be equal to 3, resulting in a width defined by $$W = \frac{54}{3}.$$

Utilizing these exemplary values, a resulting modified location can be defined by the values X=32, Y=22, and W=18 (e.g., remainders can be rounded and/or dropped). This condensation of the hash table 800 effectively lowers resolution of the signature, thus enabling a search to be completed more quickly (albeit sacrificing precision). Thereafter, translation and/or rotation error that can occur when capturing a digital image of a printed document can be accounted for by providing a threshold tolerance for each value. For instance, an error threshold of 1 can be provided in each value that identifies a location and width of the word. Thus the hash table 800 will comprise a "TRUE" value for locations in the hash table 800 correlating to ([31, 33], [21, 23], [17, 19]).

In accordance with yet another aspect of the present invention, a function can be employed to alleviate a need to store values corresponding to word location and width, and replace such values with a single unique value, hereafter referred to as a key. For example, a threshold value for maximum width of a word (maxwidthword) and a maximum width of a page in pixels (or a maximum width of adjusted pixel values) (maxwidthpage) can be defined. Then H(X, Y, W) can be defined to be equal to Y×maxwidthpage×maxwidthword+X×maxwidthword+W.

It is understood that maxwidthpage and maxwidthword can be large prime numbers, as the above equation is simply an exemplary hash function. Other hash functions that map location and width of words within a document are also contemplated (e.g., perfect hashing can be utilized). Utilizing such a function enables discarding of the X, Y, and W values within the hash table 800 (and thus reduces memory required to store and/or compare the hash table 800 with a disparate hash table). Moreover, the hash table 800 can discard all false values to further reduce memory required to store such hash table 800 (e.g., the hash table will only include keys that were associated with "TRUE" values). While the hash table 800 has been illustrated as a signature that can represent an image of a document, it is to be understood that other data formats and/or structures have been contemplated and are intended to fall within the scope of the hereto-appended claims. Furthermore, approximate hash tables, which are known to be less brittle than conventional hash tables, can be employed in connection with the present invention.

Turning now to FIG. 9, the hash table 800 (FIG. 8) is illustrated as a cube 900 to facilitate a better understanding of such hash table 800. The cube 900 is bound in an X-direction by a width of an image (e.g., in pixels) relating to the hash table 800, bound in a Y-direction by a height of an image (e.g., in pixels) relating to, and bound in a W-direction by a predefined threshold (e.g., a maximum allowable width of a word in pixels). Thus, for instance, the outer bounds of the cube 900 can be X=1000, Y=1200, and W=50 for an image that has a width of 1000 pixels and a height of 1200 pixels, and a predefined maximum word width is 50. Furthermore, a size of the cube 900 can be reduced by dividing height and width of an image by a common value, and also can be further reduced by dividing width values. For example, the height and width of an image can be divided by 5, and width values can be divided by 2. Therefore, referring to the previous example, the cube 900 will have bounds of X=200, Y=240, and W=25.

The cube 900 comprises volumetric areas 902 and 904 corresponding to "TRUE" values within the hash table 800. The volumetric areas 902, 904 are three-dimensional because error has been accounted for that can occur due to translation and/or rotation when capturing a digital image of a printed document. A center of the volumetric areas 902 and 904 are actual locations and widths of words within an image, and such point is expanded by a predefined threshold for error. Otherwise, such "TRUE" values would appear as individual points within the cube 900. When comparing a second hash table to the hash table 800, one can imagine the cube 900 transposed with a cube corresponding to the second hash table, and determining whether there are any incidences of overlap between the cubes. Thereafter a number of overlaps between the two cubes can be tabulated and utilized to determine whether the cubes relate to a substantially similar document.

Figure 10:
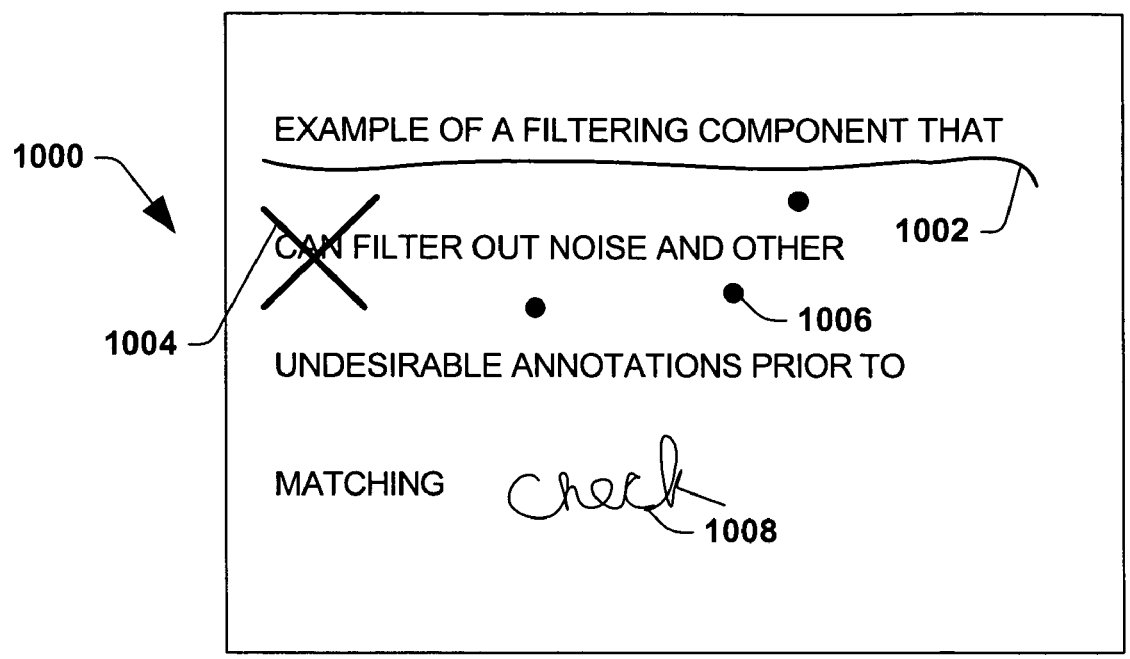
FIG. 10 is an exemplary document comprising a plurality of annotations in accordance with an aspect of the present invention.

Now referring to FIG. 10, an exemplary image 1000 of a printed document comprising noise is illustrated. The document 1000 includes a plurality of words and a plurality of annotations relating to the words. A line 1002 exists that underlines a first line of the image. The word "can" in a second line of the image 1000 is associated with an annotation 1004 that partially overwrites the word. Several markings 1006 exist throughout the image 1000, wherein the markings can originate from a pen, pencil, dirt, food, etc. Finally, a handwritten word 1008 has been added to the image 1000. These annotations and markings 1002-1008 were created upon a printed document, and do not exist on the original electronic version of the document. Therefore, it is beneficial to remove these annotations prior to generating a signature of the image 1000. Resulting from noise reduction should be "clean" words: words that are not connected via annotations, words that are not smudged or unclear, etc.

Figure 11:
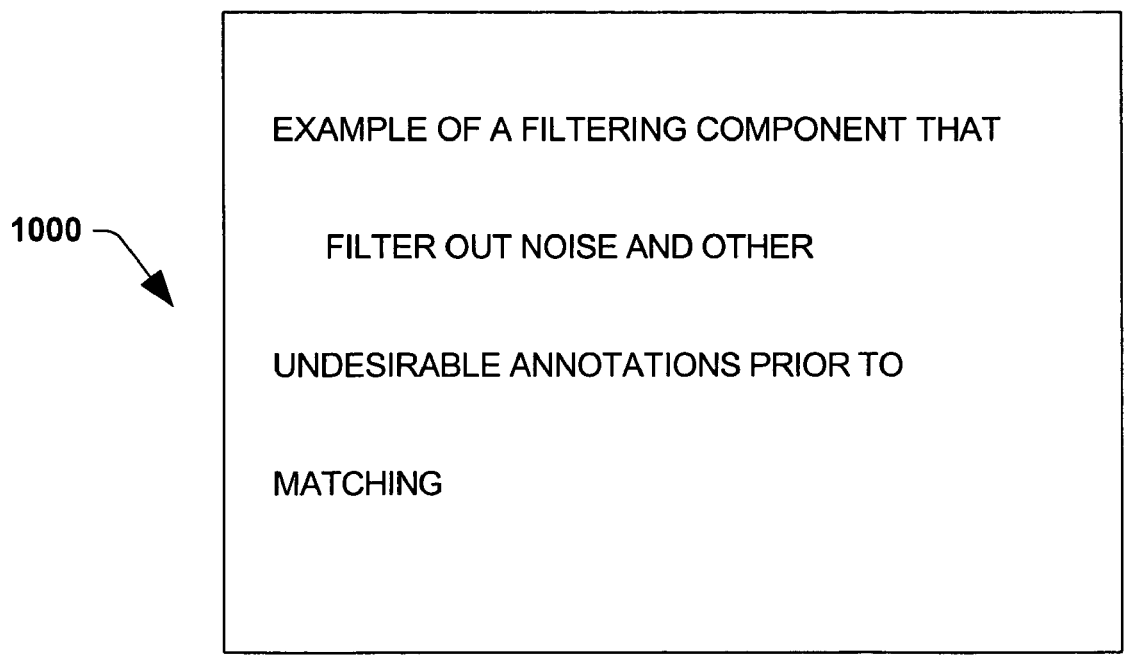
FIG. 11 is the document of FIG. 10 upon filtering noise existent within the document in accordance with an aspect of the present invention.

Turning now to FIG. 11, the image 1000 (FIG. 10) is illustrated upon removal of the annotations. It is to be understood that a reduction of noise as illustrated with respect to FIGS. 10 and 11 is merely exemplary, and such noise reduction can cause the image to appear differently than shown in FIG. 11. The line 1002 (FIG. 10) can be removed by providing a filter that removes all markings over a threshold width. For example, a maximum allowable width of a word can be defined, and any marking beyond that allowable width can be removed. Furthermore, a minimum allowable width of a word can be defined, and any marking that does not meet the requisite minimum width can be removed. Thus, the markings 1006 (FIG. 10) can be filtered from the image 1000 as such markings do not meet the requisite width. Similarly, a maximum and minimum height of words can be pre-defined to filter undesirable annotations within the image 1000. Boundaries can be defined within the image, and any markings falling outside such boundaries can be removed. In another example, particular colors within an image can be altered and/or removed. Furthermore, words within the image 1000 can be eliminated that are directly associated with an annotation (e.g., the word "can") without affecting robustness of the present invention due to a unique nature of word-layout within a document as well as a number of words within a typical document. More particularly, a plurality of words can be removed as noise within a document without affecting efficiency and/or robustness of locating a corresponding image. Moreover, the present invention can remove embedded images within the document as noise, thereby allowing identification of such document based upon word layout. The present invention contemplates numerous filtering techniques that can effectively filter out noise (such as annotations 1002-1008) within an image of a printed document.

Figure 12:
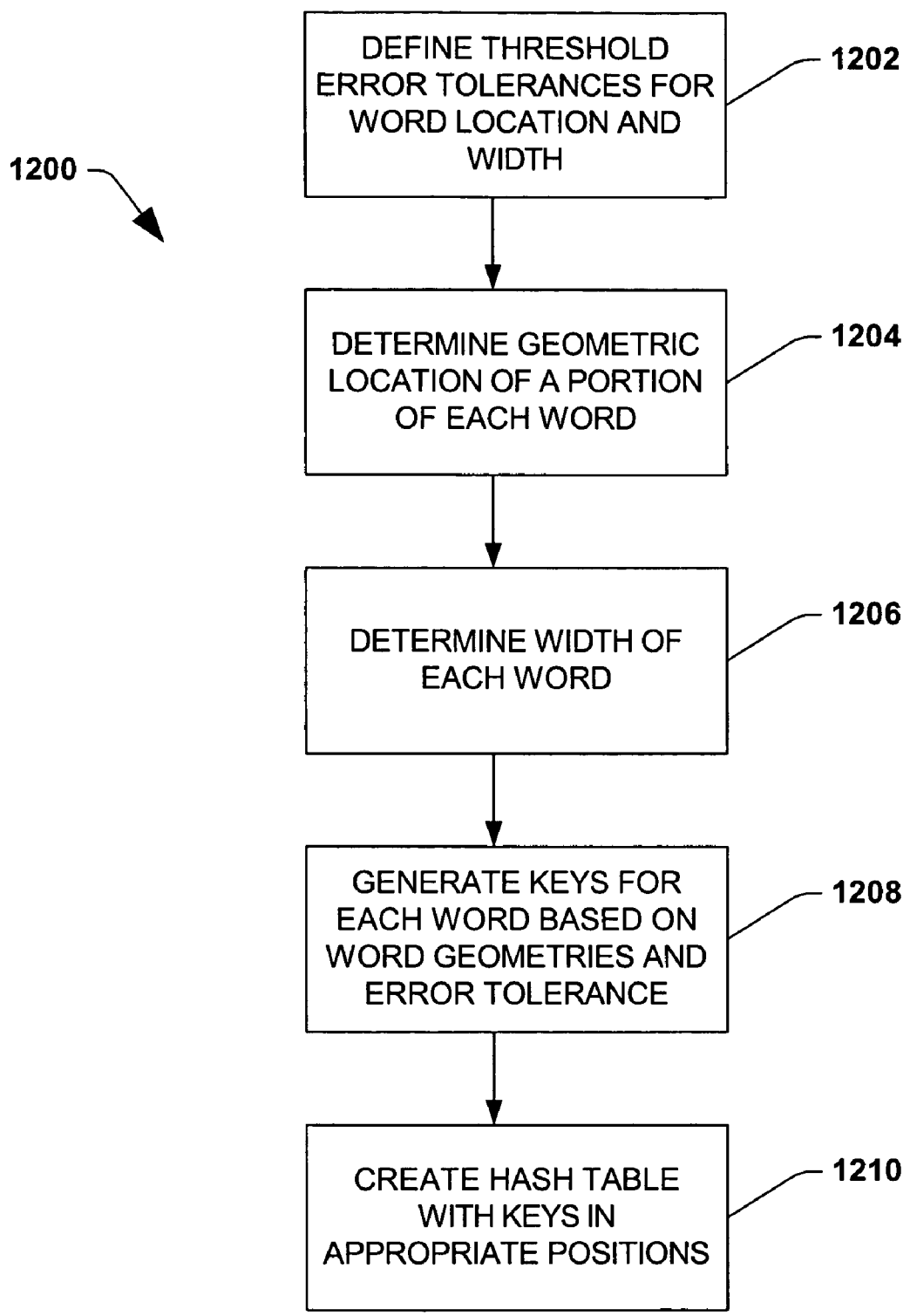
FIG. 12 is a representative flow diagram that illustrates a methodology for generating a signature of a stored image in accordance with an aspect of the present invention.

Turning now to FIG. 12, a methodology 1200 for generating a hash table that is utilized as a signature to identify a cached image is illustrated. At 1202, a threshold amount of allowable error is defined. Providing such allowable error can be important in locating an image based upon a signature of the image and a signature of an image of a printed document. If error tolerance is not provided, then a possibility exists that an image that is substantially similar to a printed document will not be located due to translation and/or rotation errors.

At 1204, a geometric location of at least a portion of each word within an image is determined. For example, a location of an upper-left corner of each word in the image can be determined and temporarily stored. However, it is to be understood that any portion of words (or entire words) within a document can be located in connection with representing a word layout of the images. At 1206, a width of each word within the document is determined via, for example, counting a number of pixels along a width of each word. Thereafter widths measured in pixels can be scaled in order to generate a desirably sized signature.

At 1208, "keys" are generated corresponding to a word layout within the image. For instance, values of "TRUE", which can be a bit or series of bits, can be generated for locations within the document relating to existence of words as well as width of words. Such locations and widths corresponding to "TRUE" values can be temporarily stored and utilized within a hash table, while values that are not "TRUE" can be discarded. Moreover, when an error tolerance has been allowed more than one key can be generated for each word location and width. For instance, if an error tolerance of +/−2 is allotted and a position and width of a word (X,Y,W) is (10, 12, 15), then true key values would be generated for (8, 14, 15), (8, 11, 12), etc. It is to be understood, however, that "TRUE" values are not necessary for implementation of the present invention. For instance, a "NULL" value could be generated for locations within the document relating to existence of words as well as width of words.

At 1210, the key values are employed to generate a hash table that can be compared with other hash tables to facilitate locating the original electronic version of a document based upon a captured digital image of a corresponding printed document. For example, the hash table can include values corresponding to (X,Y,W) values that are associated with "TRUE" values. Thus, for example, if 100 "TRUE" values existed for one particular image, then the hash table would comprise those 100 "TRUE" values in the form of the keys that identify each location and width within the image. Furthermore, values defining location and width can be utilized in a function that renders storing all three values unnecessary.

Figure 13:
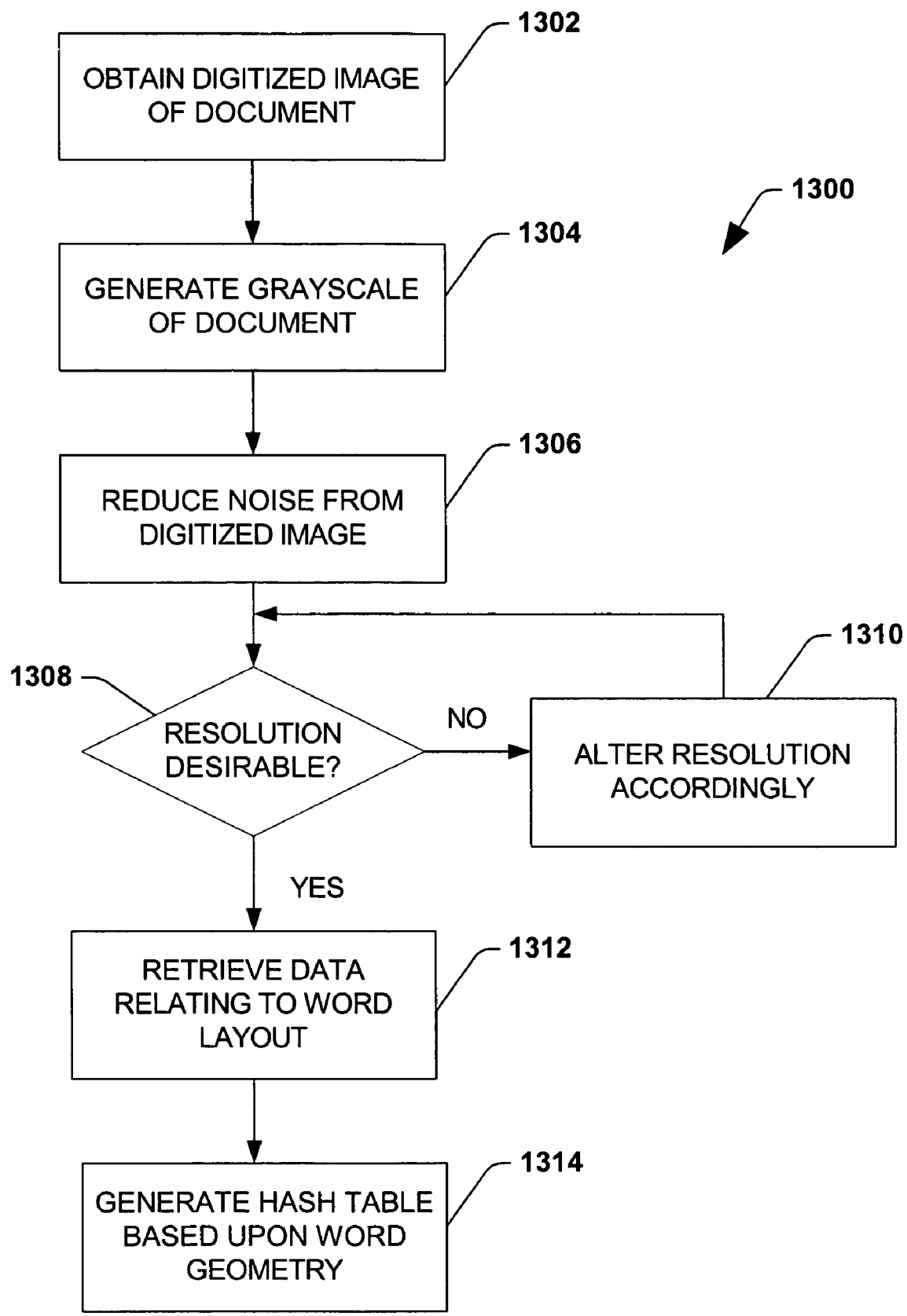
FIG. 13 is a representative flow diagram that illustrates a methodology for generating a signature of an electronic image of a printed document in accordance with an aspect of the present invention.

Now referring to FIG. 13, a methodology 1300 for generating a signature of a captured image of a printed document is illustrated. At 1302, a digital image of a printed document is captured. For instance, a digital camera or a scanner can be employed to capture the image of the document. At 1304, a grayscale of the image is obtained. Generating a grayscale image can be desirable due to colorization issues that arise when obtaining an image of a physical entity. For instance, given a particular lighting, an image can appear to have a yellow background and green lettering. The present invention contemplates altering colors at predefined color values (e.g., yellow) to a desirable color (e.g., white). Thus, colors within the image of the printed document will substantially match colors existent within a corresponding cached image.

At 1306, noise remaining within the captured image is reduced. For example, one or more filters can be provided to remove annotations existent within the printed document that do not exist within a corresponding cached image. More particularly, a filter that removes markings over and/or below a pre-defined threshold width and/or height can be employed. Furthermore, frequencies of markings can be reviewed to determine whether they are undesirable noise. Such filters can also remove dirt, stains, fold marks, etc. Such noise removal facilitates rendering the captured image substantially similar to a cached image.

At 1308, a determination is made regarding whether a resolution of the image is desirable. Resolution of the image should be altered to normalize such image with respect to those images within the data store. For example, dimensions of the captured image and the stored images should be substantially similar to enable optimal operation of the present invention. If such resolution is not desirable (e.g., resolution is too high), then at 1310 resolution is altered. For example, a high-resolution image may require altering to facilitate merging individual characters without merging disparate words. Furthermore, resolution may be altered to generate a signature of desirable size. If the resolution of the image is desirable, at 1312 data relating to word-layout within the image is retrieved. For example, X-Y coordinates (in pixels or other suitable unit within the image) of at least a portion of each word can be retrieved, and width of each word can also be retrieved. Utilizing these values, a word layout of the document can be defined. At 1314, a hash table is generated based upon the word layout. For instance, the hash table can comprise only key values corresponding to a location and width of words existent within the image of the printed document. Thereafter, such key values can be placed within a hash table and compared with key values of a disparate hashed image to determine whether images corresponding to such values are substantially similar.

As can be discerned from reviewing FIGS. 12 and 13, methodologies for generating signatures for a stored image of an electronic document and a captured image of a printed document are substantially similar. Differences exist in the sources of the images and noise reduction that takes place. More particularly, the captured image is obtained via a digital camera, scanner, fax card or the like. Images of electronic documents originate from a caching component that can be related to a print driver. Furthermore, noise is desirably removed from captured images to generate an image substantially similar to a stored image. For instance, annotations, smudges, and other noise can be removed when generating a signature for a captured image.

Figure 14:
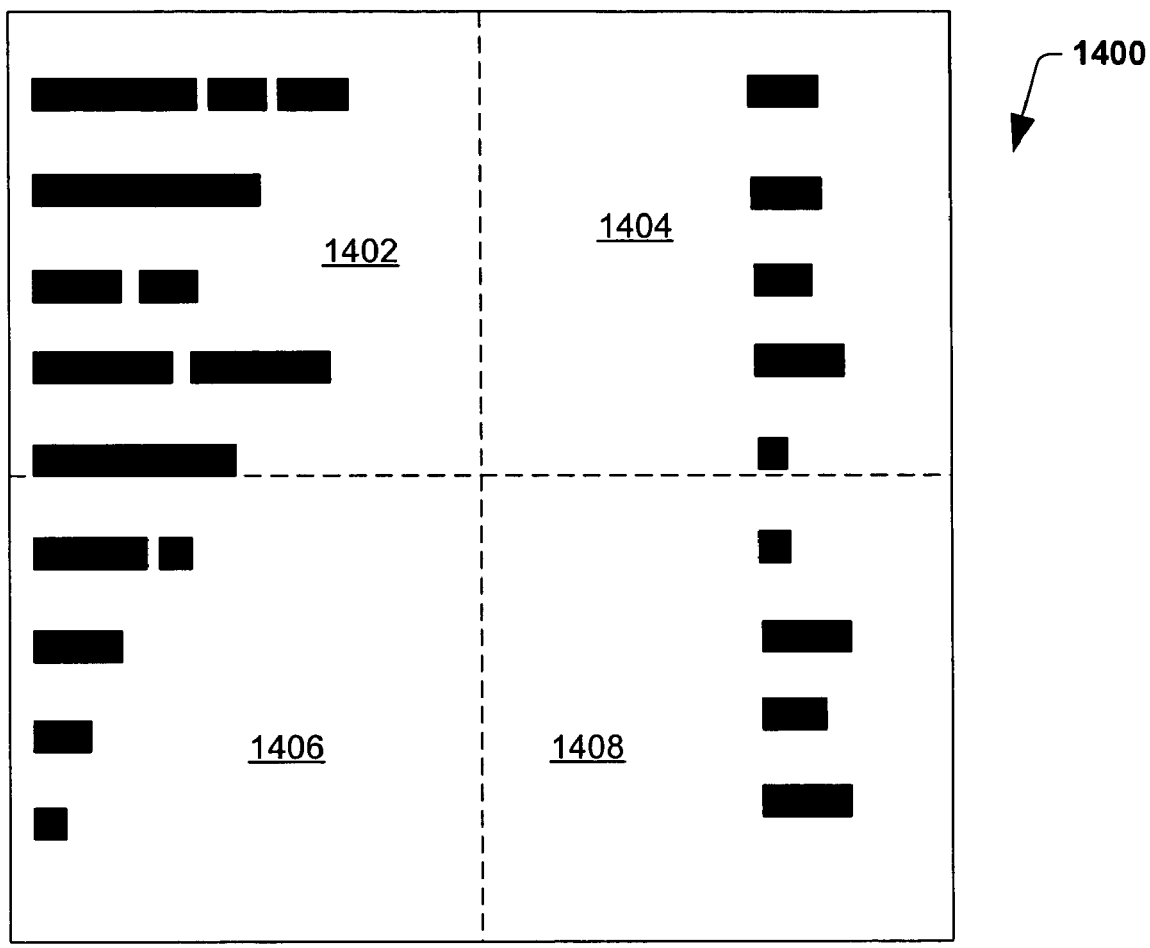
FIG. 14 illustrates a segmentation of an image in accordance with an aspect of the present invention.

Now referring to FIG. 14, an exemplary image 1400 of a printed document that has been partitioned in accordance with an aspect of the present invention is illustrated. Partitioning can be beneficial when numerous signatures of cached images must be compared with a signature of an image of a printed document to determine which of the cached images is substantially similar to the printed document. For example, a substantial amount of time may be required to compare each signature of the cached images with the signature of the image of the printed document entirely. Thus, the image 1400 can be partitioned into a plurality of segments 1402, 1404, 1406, and 1408, and thus only a portion of the signature of the image 1400 is compared with a substantially similar portion of the signatures of the cached images. While the image 1400 is shown as being divided into four segments, it is to be understood that any suitable number of segments can be chosen. For instance, a number of segments of the image 1400 can be a function of a number of cached images (e.g., a greater number of cached images, a greater number of segments and a smaller size of segments).

Thus, only a portion of a plurality of signatures of cached images will be compared with a corresponding portion of a signature of the image 1400 that is associated with one of the segments 1402-1408. Thereafter, any signatures of the cached images that have a match or threshold number of matches between the portion of the cached signatures and the corresponding portion of the signature of the image 1400 will be retained for further consideration, while those signatures that do not comprise a match will be discarded. For example, the segment 1402 is associated with a particular portion of a signature that identifies the image 1400. Such portion of the signature can then be compared with corresponding portions of signatures related to cached images. Signatures of the cached images that have a match or a threshold number of matches between such portions of the signature(s) with the corresponding signature of the image 1400 will be further considered. Thereafter, the image 1400 can be further partitioned into smaller segments, thereby eventually eliminating non-matching signatures from consideration and leaving a signature that substantially matches the signature of the image 1400. It is possible, however, that due to damage and/or errors in noise reduction a most correct matching signature will be eliminated from consideration due to a particular segmentation. Such wrongful elimination can be found by requiring a threshold number of images to be considered for each segmentation, and by performing a more thorough check once a number of images drops below the threshold. If the thorough check results in a determination that remaining signatures do not substantially match a signature of the image 1400, then the image 1400 can be re-partitioned and a disparate partition can be selected. If a high-confidence match does exist, then the image corresponding to a signature can be returned to a user.

Figure 15:
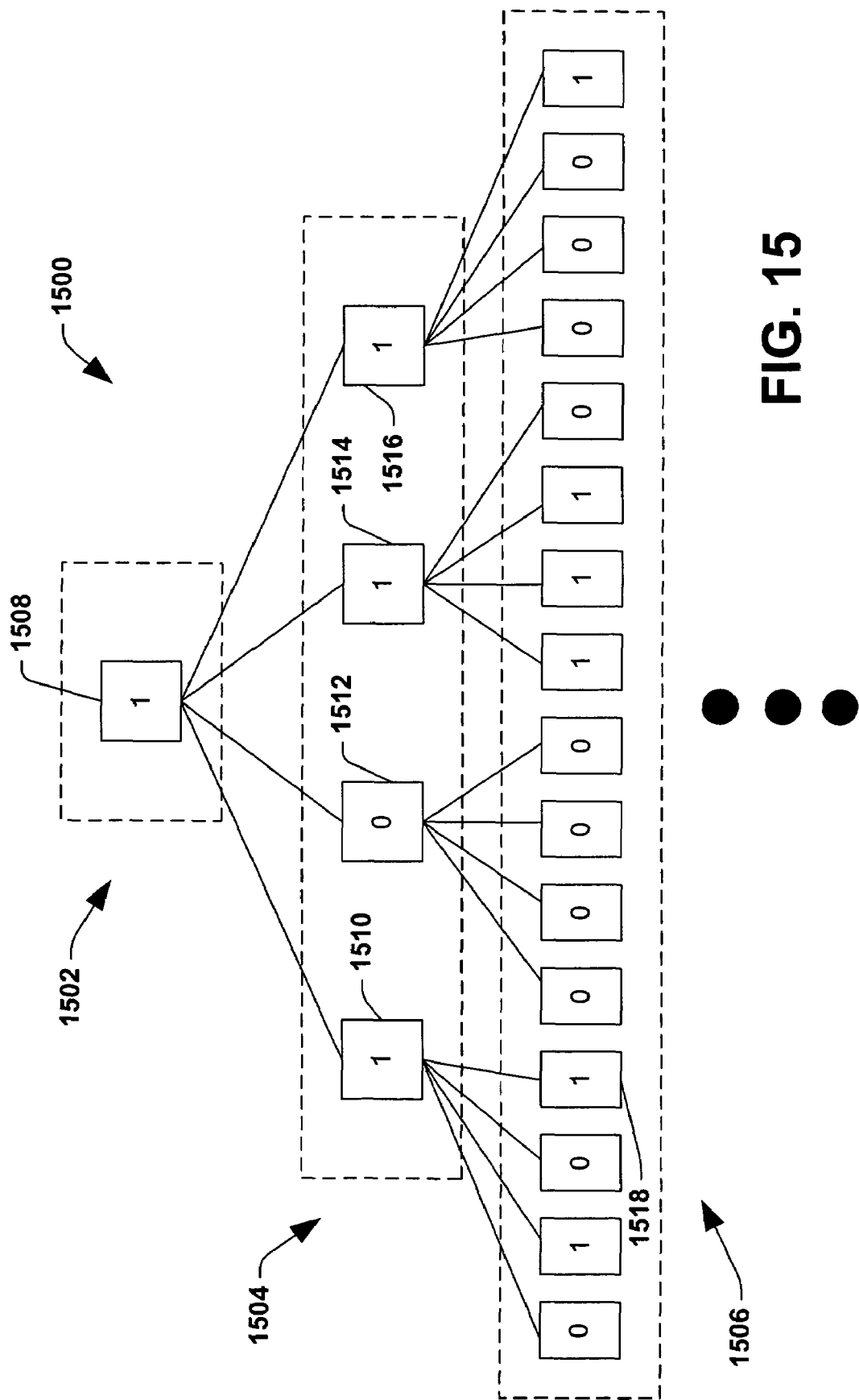
FIG. 15 is a high-level block diagram illustrating an exemplary tree representation of an image of a document in accordance with an aspect of the present invention.

Turning now to FIG. 15, an exemplary tree representation 1500 of an image of at least a portion of a document is illustrated. The tree representation includes multiple tiers 1502-1506, wherein each tier represents a level of partition within a document. More particularly, the first tier 1502 includes a single segment 1508 that represents an entire image (e.g., an image of a page of a document). If the image includes one or more words, then a value of one (or other value that identifies that one or more words exist within the segment 1508) is assigned to the segment 1508 within the tree representation 1500. Alternatively, if the image was blank, then a value of "0" (or other value that confirms that no words exist within the segment 1508) is assigned. Thereafter the segment 1508 is partitioned into segments 1510-1516, wherein the segments 1510-1516 are associated with the second tier 1504 of the tree representation. A determination is made regarding whether each segment 1510-1516 includes one or more words. For instance, one or more words exist within segment 1510 as illustrated by a value of one assigned to the segment 1510. No words exist within the segment 1512, which has been assigned a value of zero.

Each of the segments 1510-1516 can be further divided into a plurality of segments 1520 on the third tier 1506 of the hierarchy. As can be determined by reviewing segment 1512, if such segment is assigned a zero all segments associated with the segment 1512 in the lower tiers of the hierarchy will all also be assigned a zero (and therefore do not need to be included in the tree, and can be excluded to improve the storage efficiency of the tree structure). The tree representation 1500 can include any suitable number of tiers to enable a number of signatures to be contemplated during a comparison to be reduced. For example, a signature is generated based upon topological properties of words within the images. More particularly, the signature can be generated based upon location of a portion of each word and width of each word. The tree representation can be generated at a substantially similar time that the signatures are generated (for both a captured image and cached images), and can be employed to quickly reduce a number of signatures to be compared when locating an electronic version of a document based upon an image of a printed copy of the document.

For example, the tree representation 1500 can represent a captured image of a printed page of a document. The second tier 1504 of the tree representation 1500 can be compared with a corresponding second tier of tree representations of cached images. If segments of a cached image corresponding to the segments 1510, 1514, and 1516 are not all assigned a one, then the signature corresponding to the tree representation of the cached image will not be further considered. If segments of the cached image corresponding to the segments 1510, 1514, and 1516 are all assigned a one, then the signature corresponding to the tree representation of the cached image will be kept for further consideration. Furthermore, it is to be understood that the segments of the cached image corresponding to the segments 1510, 1512, 1514, and 1516 can all be assigned a one and the signature corresponding to the tree representation will be retained for further consideration. This is true even in light of the segment 1512 of the tree representation 1500 of the captured image being assigned a zero, since this segment of the printed document image may appear to be empty due to smudges, tears, etc. that may have occurred in the physical document. For instance, segment 1512 can be covered by a stain, and thus after noise mitigation the segment 1512 of the captured image will not include any words, even though words existed in the electronic version of the document at the time the document was printed. Furthermore, if comparing the second tier 1504 of the tree representation 1500 associated with the captured image to a corresponding second tier of tree representations associated with cached images does not sufficiently reduce a number of signatures to be considered, the third tier 1506 of the tree representations can be compared. The tree representations can include a sufficient number of tiers to enable a number of remaining documents to be of a number below a pre-defined threshold, thus allowing a more thorough comparison of signatures to be completed quickly. The tree representations can be located in the data store and associated with an image just as the image's signature is associated with it in the data store.

Figure 16:
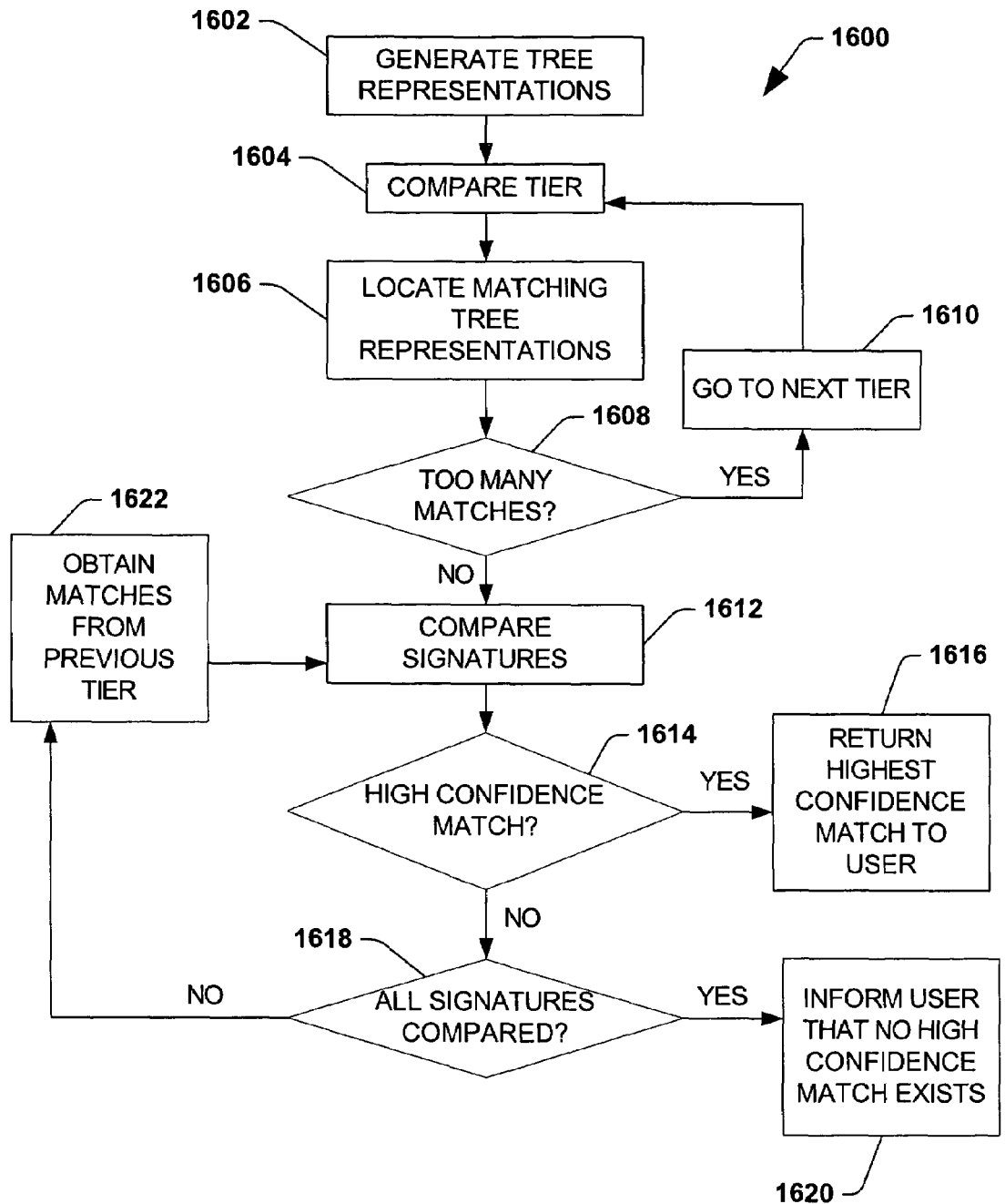
FIG. 16 is a representative flow diagram that illustrates a methodology for comparing signatures in accordance with an aspect of the present invention.

Now referring to FIG. 16, a methodology 1600 for locating a signature of an image amongst a plurality of signatures that is substantially similar to a signature of an image of a printed document based upon word-layout of the document is illustrated. At 1602 tree representations associated with each cached image as well as a tree representation associated with a captured image of a printed document are generated. An exemplary tree representation is illustrated in FIG. 15. The tree representations can be generated at a substantially similar time that images signatures are generated. The signatures are generated based upon word-level topological properties of a page of a document, while the tree representations are a hierarchical representation of an image of a document; wherein the image is partitioned into a number of segments and each segment is assigned a value depending on whether a word exists within the segment. Those segments can be further partitioned, thus creating the hierarchical representation.

At 1604, a tier of the tree representation related to the captured image of the printed document is compared with a corresponding tier of tree representations associated with the cached images. For instance, a first tier would include a segment that represented an entire image—thus if the captured image contained one or more words, the segment would be associated with a value that indicated that the image contained one or more words. Therefore, if a cached image did not contain one or more words, the first tier of the tree representation of the cached image would include a segment associated with a value that indicated that the segment did not include one or more words. A second tier of the tree representation would include a plurality of segments, and each segment would be associated with a value that indicated whether the segments included a word. Thus, comparing corresponding tiers of the tree representation associated with the captured image and tree representations associated with cached images can quickly reduce a number of signatures to be considered when attempting to locate an electronic version of a document that most matches a printed version of the document.

At 1606, the tree representations related to cached images that have a desirable tier substantially matching a corresponding tier related to the captured image are retained for further consideration. The tier of the tree representation related to the captured image is not required to identically match the corresponding tier of the tree representations related to the cached images, as smudges, tears, and other physical damage to the printed document can occur that would cause mismatch. For instance, a segment could be completely removed due to a tear, thus causing a tree representation to convey that the segment does not include any words. If not for the tear, however, the segment would have included one or more words. Thus, to be further considered, segments within the tree representations related to the cached images must match corresponding segments related to the tree representation of the captured image during instances that the segments of the captured images include one or more words.

At 1608, a determination is made regarding whether too many signatures (and thus too many tree representations) remain under consideration. For instance, matching signatures that are generated based on word-level topological properties can require a substantial amount of time. Thus it is beneficial to reduce a number of signatures related to cached images that are to be compared to the signature related to the captured image. If the number of remaining signatures under consideration is greater than a threshold number, at 1610 a next tier in the tree representation hierarchy is selected for comparison. Selecting a next tier in the hierarchy of the tree representation enables reduction of a number of signatures to be considered prior to comparing signatures. If the number of signatures is to be considered is below the threshold, then at 1612 the signature related to the captured image is compared to signatures of cached images remaining under consideration. The signatures are generated based at least in part upon topological properties of words within the images (e.g., location and width of each word within the image).

At 1614 a determination is made regarding whether the signature with a highest score meets a threshold score requirement (e.g., whether the signature is a "high-confidence" match). If the signature related to the cached image that compares most favorably to the signature of the image of the printed document is a high-confidence match, an image corresponding to that signature is returned to the user at 1616. If such signature is not a high-confidence match, a determination is made at 1618 regarding whether every signature relating to the cached images have been compared to the signature related to the captured image. If every signature relating to the cached images has been compared, a user is informed that there is no high-confidence match at 1620. This can occur when no cached image exists corresponding to the printed document and when the printed document has been damaged to an extent that identification of such document is extremely problematic. Otherwise, signatures previously discarded from consideration based upon their associated tree representations can be reconsidered via reconsidering documents that were discarded at a previous tier at 1622. For example, supposed comparing a fifth tier of the tree representations was required to reduce the number of signatures to be compared to the threshold value. No signatures related to the remaining tree representations, however, produced a high-confidence match when compared to the signature of the captured image. Thus in accordance with an aspect of the present invention, all signatures remaining under consideration at the fourth tier of the tree representation can be compared.

After the signatures discarded based upon a particular tier of the tree representations have been re-considered, the methodology 1600 continues at 1612. Furthermore, it is to be understood that when directly comparing signatures at 1612, the signatures can be divided into portions, and portions of the signature related to the captured image can be compared to corresponding portions of the signatures related to the cached images. This can be beneficial in instances when it is known that portions of the signature related to the captured document will not have a match due to noise that was mitigated in particular portions of the captured image. This can substantially expedite a matching procedure.

Figure 17:
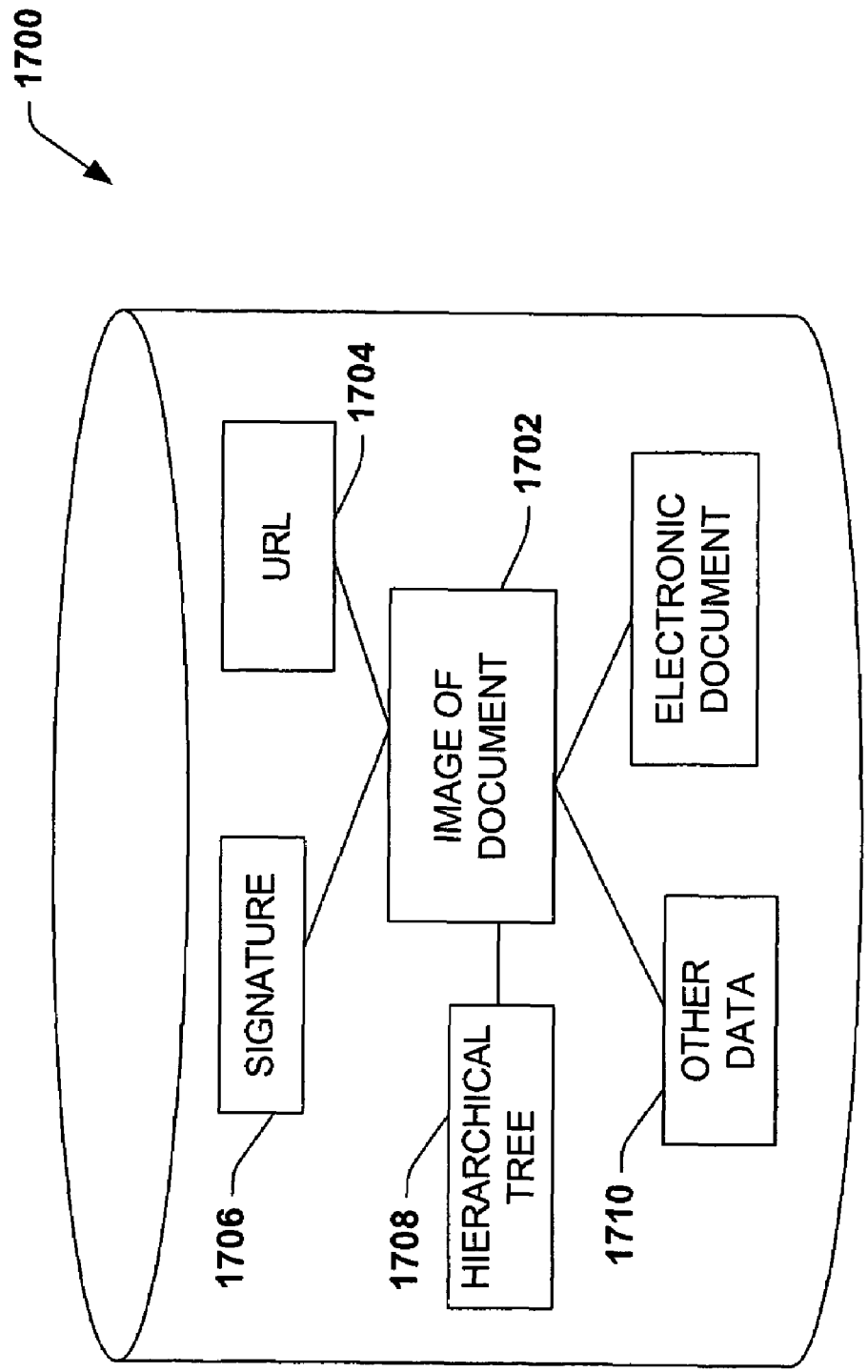
FIG. 17 is an exemplary data store that can be utilized in connection with features described herein.

Turning now to FIG. 17, an exemplary data store 1700 and contents thereof in accordance with an aspect of the present invention is illustrated. The data store 1700 can be considered a relational database, wherein an image 1702 of a page of an electronic document is the "primary" entity within the data store 1700. While the exemplary data store 1700 is only shown to include a single image 1702, it is to be understood that the data store 1700 typically will contain a plurality of images and data associated therewith. Examples of associated data include a URL 1704 that identifies a location of an electronic document corresponding to the image 1702 of a page of such electronic document. The URL can be provided to a user upon searching the data store 1700 for the image 1702 based upon a later-acquired corresponding printed page. More particularly, a signature 1706 is associated with the image 1702, and such signature 1706 is compared to a signature relating to the image of the printed page. Upon comparing the signatures and determining that the image 1702 most closely matches the image of the printed document, the associated URL 1704 can be relayed to the user. Furthermore, the image 1702 can also be relayed to the user. If the data store 1700 includes an electronic version of the document corresponding to the image 1702, then the document itself can be returned to the user upon comparing signatures. Furthermore, a hierarchical tree 1708 can also be associated with the image 1702 to facilitate expediently excluding the image 1702 from a search as described supra. Other related data 1710 can also be associated with the image 1702, such as, for example, OCR of the image 1702, metrics on how often the page image has been accessed within the data store 1700, customer records, workflow information (e.g., workflow history), payment information, and other suitable data that can be related to an electronic document. However, it is to be understood that permanent storage of the image 1702 is not required for the subject invention to operate. For instance, the image 1702 can be generated and temporarily stored, and the signature 1706 can be generated from the image 1702. Thereafter, the image 1702 can be discarded to increase available space within the data store 1700. The signature 1702 can be associated with a URL that identifies a location of an electronic document corresponding to the image 1702. Other elements within the data store 1700 can also be associated with the signature 1706.

Figure 18:
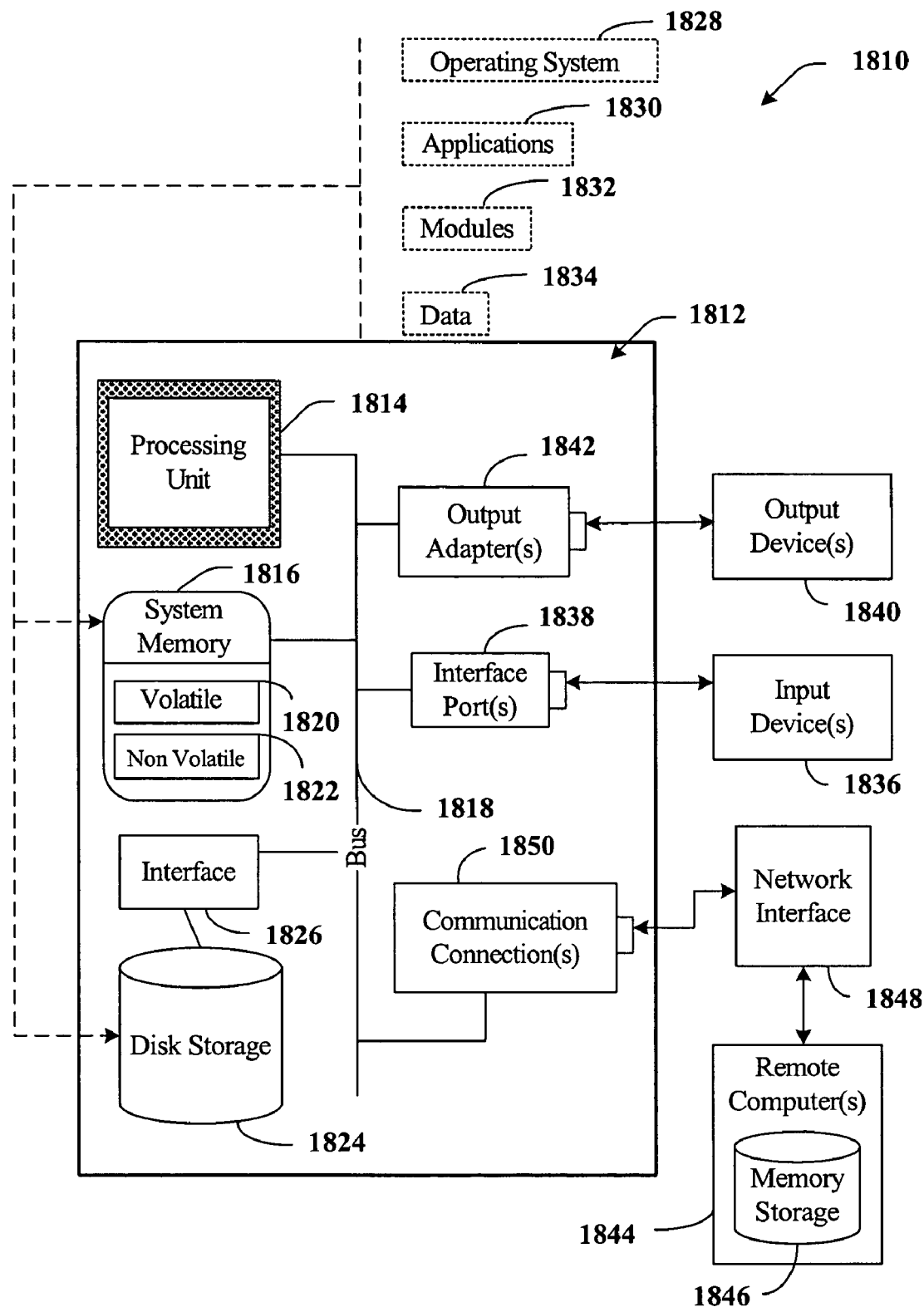
FIG. 18 illustrates an example operating environment in which the present invention may function.

With reference to FIG. 18, an exemplary environment 1810 for implementing various aspects of the invention includes a computer 1812. The computer 1812 can be any suitable computing device (e.g., a personal digital assistant, laptop computer, server, desktop computer, . . . ) The computer 1812 includes a processing unit 1814, a system memory 1816, and a system bus 1818. The system bus 1818 couples system components including, but not limited to, the system memory 1816 to the processing unit 1814. The processing unit 1814 can be any of various available processors. Dual microprocessors and other multiprocessor architectures also can be employed as the processing unit 1814.

The system bus 1818 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1816 includes volatile memory 1820 and nonvolatile memory 1822. The basic input/output system (BIOS), containing the basic routines to transfer information between elements within the computer 1812, such as during start-up, is stored in nonvolatile memory 1822. By way of illustration, and not limitation, nonvolatile memory 1822 can include read only memory (ROM), programmable ROM (PROM), electrically programmable ROM (EPROM), electrically erasable ROM (EEPROM), or flash memory. Volatile memory 1820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1812 also includes removable/nonremovable, volatile/nonvolatile computer storage media. FIG. 18 illustrates, for example a disk storage 1824. Disk storage 1824 includes, but is not limited to, devices like a magnetic disk drive, floppy disk drive, tape drive, Jaz drive, Zip drive, LS-100 drive, flash memory card, or memory stick. In addition, disk storage 1824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1824 to the system bus 1818, a removable or non-removable interface is typically used such as interface 1826.

It is to be appreciated that FIG. 18 describes software that acts as an intermediary between users and the basic computer resources described in suitable operating environment 1810. Such software includes an operating system 1828. Operating system 1828, which can be stored on disk storage 1824, acts to control and allocate resources of the computer system 1812. System applications 1830 take advantage of the management of resources by operating system 1828 through program modules 1832 and program data 1834 stored either in system memory 1816 or on disk storage 1824. It is to be appreciated that the present invention can be implemented with various operating systems or combinations of operating systems.

A user enters commands or information into the computer 1812 through input device(s) 1836. Input devices 1836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1814 through the system bus 1818 via interface port(s) 1838. Interface port(s) 1838 include, for example, a serial port, a parallel port, a game port, and a universal serial bus (USB). Output device(s) 1840 use some of the same type of ports as input device(s) 1836. Thus, for example, a USB port may be used to provide input to computer 1812, and to output information from computer 1812 to an output device 1840. Output adapter 1842 is provided to illustrate that there are some output devices 1840 like monitors, speakers, and printers among other output devices 1840 that require special adapters. The output adapters 1842 include, by way of illustration and not limitation, video and sound cards that provide a means of connection between the output device 1840 and the system bus 1818. It should be noted that other devices and/or systems of devices provide both input and output capabilities such as remote computer(s) 1844.

Computer 1812 can operate in a networked environment using logical connections to one or more remote computers, such as remote computer(s) 1844. The remote computer(s) 1844 can be a personal computer, a server, a router, a network PC, a workstation, a microprocessor based appliance, a peer device or other common network node and the like, and typically includes many or all of the elements described relative to computer 1812. For purposes of brevity, only a memory storage device 1846 is illustrated with remote computer(s) 1844. Remote computer(s) 1844 is logically connected to computer 1812 through a network interface 1848 and then physically connected via communication connection 1850. Network interface 1848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1850 refers to the hardware/software employed to connect the network interface 1848 to the bus 1818. While communication connection 1850 is shown for illustrative clarity inside computer 1812, it can also be external to computer 1812. The hardware/software necessary for connection to the network interface 1848 includes, for exemplary purposes only, internal and external technologies such as, modems including regular telephone grade modems, cable modems and DSL modems, ISDN adapters, and Ethernet cards.

Figure 19:
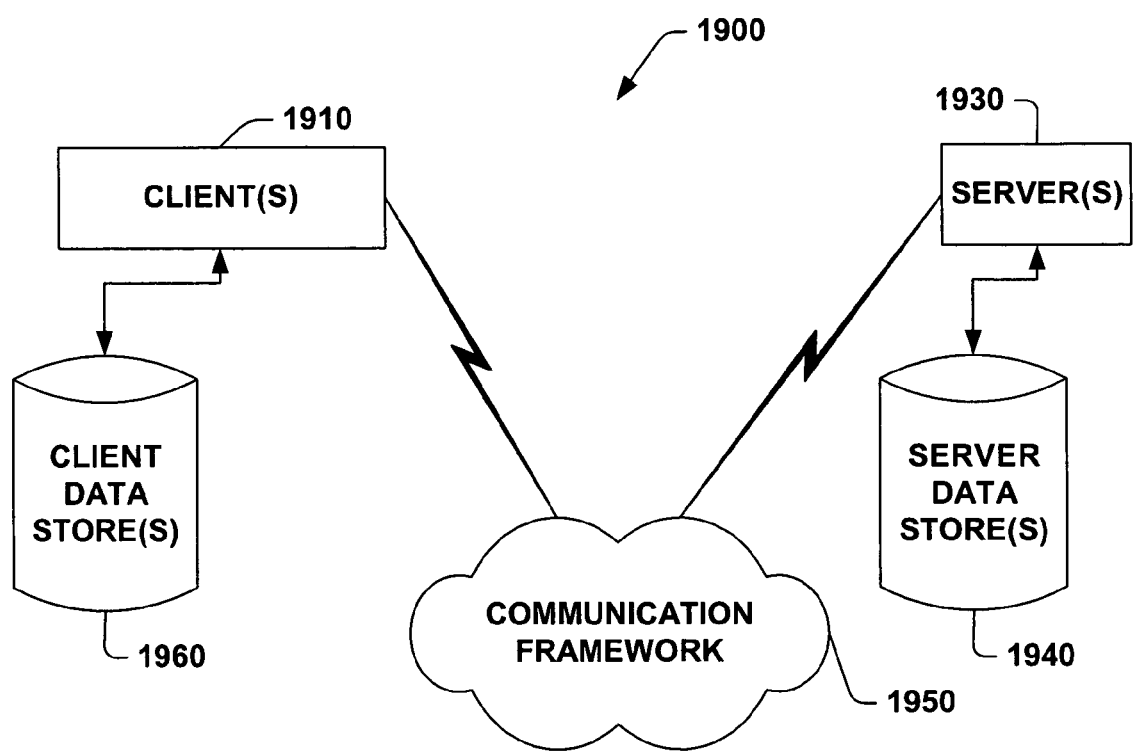
FIG. 19 is a schematic block diagram of a sample-computing environment with which the present invention can interact.

FIG. 19 is a schematic block diagram of a sample-computing environment 1900 with which the present invention can interact. The system 1900 includes one or more client(s) 1910. The client(s) 1910 can be hardware and/or software (e.g., threads, processes, computing devices). The system 1900 also includes one or more server(s) 1930. The server(s) 1930 can also be hardware and/or software (e.g., threads, processes, computing devices). The servers 1930 can house threads to perform transformations by employing the present invention, for example. One possible communication between a client 1910 and a server 1930 may be in the form of a data packet adapted to be transmitted between two or more computer processes. The system 1900 includes a communication framework 1950 that can be employed to facilitate communications between the client(s) 1910 and the server(s) 1930. The client(s) 1910 are operably connected to one or more client data store(s) 1960 that can be employed to store information local to the client(s) 1910. Similarly, the server(s) 1930 are operably connected to one or more server data store(s) 1940 that can be employed to store information local to the servers 1930.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A machine-implemented system for document retrieval and/or indexing comprising:
   a processor;
   a component that receives a captured image of at least a portion of a physical document;
   a search component that locates a match to the physical document, the search is performed over word-level topological properties of generated images, the word-level topological properties comprise at least respective widths of words on the generated images, and the generated images being images of at least a portion of one or more electronic documents; and
   a comparison component that iteratively compares a portion of a signature associated with the captured image based at least in part on word-level topological properties with corresponding portions of signatures respectively associated with the generated images based at least in part on word-level topological properties and excludes each generated image whose portion of the signature does not match the portion of the signature of the captured image to facilitate location of a match to the physical document,
   the portion of the signature associated with the captured image and the portion of the signatures respectively associated with the generated images that are compared become progressively smaller with each iteration, where one or more iterations are performed until a predetermined threshold number of generated images remain,
   wherein each portion of signature respectively associated with a generated image is a hash table that contains a plurality of table locations where a respective value corresponding to a respective segment of the generated image is entered into a respective table location for each segment of the generated image, and
   wherein the portion of the signature associated with the captured image is a hash table that contains a plurality of table locations where a respective value corresponding to a respective segment of the captured image is entered into a respective table location for each segment of the captured image.

2. The system of claim 1, further comprising a component that generates signature(s) corresponding to one or more of the generated images and generates a signature corresponding to the captured image of the physical document, the signatures identify the word-layout of the generated images, and the search performed via comparing the signatures of the generated images with the signature of the captured image of the physical document.

3. The system of claim 2, the signatures being at least one of hash tables and or approximate hash tables, or a combination thereof.

4. The system of claim 3, the at least one of the hash tables and or approximate hash tables comprising a key that is associated with a location and width of a word within at least one of the generated images or the captured image of the physical document, or a combination thereof.

5. The system of claim 2, further comprising a scoring component that assigns confidence scores corresponding to a subset of the generated images that are searched against.

6. The system of claim 5, a generated image with the highest confidence score is selected as the match to the captured image of the physical document.

7. The system of claim 2, the signature(s) corresponding to the one or more generated images comprises a tolerance for error.

8. The system of claim 2, a portion of the signature(s) associated with the one or more generated images is compared to a corresponding portion of the signature of the captured image of the physical document.

9. The system of claim 8, the signature(s) corresponding to the one or more generated images that have a threshold number of matches to the corresponding portion of the signature of the captured image of the physical document are retained for further consideration.

10. The system of claim 9, further comprising a component that assigns confidence scores when a threshold number of signatures are being retained for further consideration.

11. The system of claim 2, the signatures corresponding to the one or more generated images and the signature of the captured image of the physical document are generated at least in part upon a location of at least a portion of each word in the generated images and the captured image of the physical document, respectively.

12. The system of claim 11, the signatures corresponding to the one or more generated images and the signature of the captured image of the physical document further generated at least in part upon a width of each word in the captured image and the generated images, respectively.

13. The system of claim 2, further comprising:
   a component that generates at least one tree representation related to the generated images and the captured image of the physical document, the at least one tree representation being a hierarchical representation of the generated images and the captured image of the physical document, wherein the at least one tree representation conveys which segments of the generated images and which segments of the captured image of the physical document include a word; and a comparison component that compares a tree representation related to the generated images with the tree representation related to the captured image of the physical document.

14. The system of claim 1, further comprising a component that reduces noise in the captured image of the physical document.

15. The system of claim 1, further comprising a component that generates a grayscale image of the captured image of the physical document.

16. The system of claim 1, farther comprising a connecting component that connects characters within a word of the generated images and the captured image without connecting words of the generated images and the captured image.

17. The system of claim 16, the generated images and the captured image being binary images, the connecting component performs a pixel dilation of the binary images.

18. The system of claim 17, the connecting component alters resolution of the captured image of the physical document to facilitate connecting characters within a word of the captured image of the physical document without connecting disparate words within the captured image of the physical document.

19. The system of claim 1, further comprising a caching component that automatically generates an image of an electronic document at a time such electronic document is printed.

20. The system of claim 19, further comprising an artificial intelligence component that infers which printed documents should have associated stored images.

21. The system of claim 1, further comprising an artificial intelligence component that excludes a subset of the generated images from the search based at least in part upon one of user state, user context, or user history.

22. The system of claim 1, at least one of the generated images is associated with an entry within a data store, the entry comprising one or more of an image of a page of an electronic document or a signature that identifies the image of the page, the signature based at least in part upon topological properties of words within the image of the page.

23. The system of claim 22, the one or more of the image of the page of the electronic document or the signature that identifies the image of the page associated with one or more of a URL that identifies a location of the electronic document, the electronic document, a hierarchical tree representation of the image of the page of the electronic document, OCR of the image of the page, data relating to a number of times the image of the page has been accessed, customer records, payment information, or workflow information, or a combination thereof.

24. A method that facilitates indexing and/or retrieval of a document, comprising:

generating a plurality of images of electronic documents, at least one of the images of electronic documents corresponding to a printed document;

capturing an image of a printed document after such document has been printed;

receiving a query requesting retrieval of an electronic document corresponding to the image of the printed document;

generating one or more signatures corresponding to at least a portion of one or more of the generated images, the signatures generated at least in part upon word-layout within the image(s), the one or more signatures is a hash table that contains a plurality of table locations where a respective value corresponding to a respective segment of the generated image is entered into a respective table location for each segment of the generated image;

generating a signature corresponding to at least a portion of the captured image, the signature is generated based at least in part upon word-layout within the captured image, the signature is a hash table that contains a plurality of table locations where a respective value corresponding to a respective segment of the captured image is entered into a respective table location for each segment of the captured image; and comparing the one or more signatures corresponding to the one or more generated images to the signature corresponding to the captured image; and identifying a generated image that has a highest number of table locations that have respective values that match values in corresponding table locations associated with the captured image.

25. A method that facilitates indexing and/or retrieval of a document, comprising:

receiving a captured image of at least a portion of a document; and searching at least one data store for an electronic document corresponding to the captured image, the search performed via comparing topological word properties within the captured image with topological word properties of generated images corresponding to a plurality of electronic documents, the respective topological word properties comprising at least width of each word;

generating signatures corresponding to the generated images, each of the signatures is a hash table that contains a plurality of table locations where a respective value corresponding to a respective portion of a particular generated image is entered into a respective table location for each portion of the particular generated image;

generating a signature corresponding to the captured image of the document, the signature is a hash table that contains a plurality of table locations where a respective value corresponding to a respective portion of the captured image is entered into a respective table location for each portion of the captured image;

comparing a portion of the signatures corresponding to respective generated images to a portion of the signature corresponding to the captured image; and identifying at least one generated image that has a highest number of table locations that have respective values that match values in corresponding table locations associated with the captured image.

26. The method of claim 25, further comprising:

comparing the signatures corresponding to the generated images with the signature corresponding to the captured image of the document, the signatures associated with the generated images are based at least in part upon location and width of each word within the generated images, and the signature associated with the captured image is based at least in part upon location and width of each word within the captured image.

27. The method of claim 25, further comprising:

partitioning the captured image of the document into a plurality of segments;

partitioning the generated images into segments corresponding to the segments of the captured image of the document; and comparing the word layout of the captured image of the document with the word layout of the generated images only within corresponding segments of the captured image of the document and the images within the data store(s).

28. The method of claim 27, further comprising:

assigning confidence scores to the signatures corresponding to the generated images based at least in part upon a correspondence between the word layout of the captured image and the word layout of the generated images.

29. The method of claim 25, further comprising:

partitioning the captured image of the document to create a hierarchy of segments;

partitioning the generated images to create a hierarchy of segments corresponding to the hierarchy of segments related to the captured image of the document;

assigning the segments in the captured image of the documents and the segments in the generated images a first value when the segments comprise a word;

assigning the segments in the captured image of the documents and the segments in the generated images a second value when the segments do not comprise a word;

comparing the hierarchy of segments; and removing one or more generated images from consideration when a segment associated with the one or more generated images assigned the second value and a corresponding segment associated with the captured image of the document is assigned the first value.

30. The method of claim 25, further comprising reducing noise in the captured image of the document prior to searching the data store(s).

31. The method of claim 30, wherein reducing noise comprises one or more of:

providing a filter that removes markings that have a width greater than a threshold width;

providing a filter that removes markings with a width less than a threshold width;

providing a filter that removes markings with a height greater than a threshold height; and providing a filter that removes marking with a height less than a threshold height.

32. The method of claim 25, further comprising generating a grayscale image of the captured image of the document prior to searching the data store(s).

33. A machine-implemented system for indexing and/or retrieval of a document, comprising:

a processor;

means for generating an image of an electronic document when the electronic document is printed;

means for capturing an image of the document after the document has been printed;

means for generating a signature corresponding with the generated image;

means for generating a signature corresponding to the captured image;

means for storing the electronic document;

means for iteratively comparing location of respective words and width of respective words within a portion of a signature associated with the captured image to the location of respective words and width of respective words within respective portions of signatures associated with the generated images and excluding each generated image whose signature portion does not match the signature portion of the captured image, the portion of the signature associated with the captured image and the corresponding portions of the signatures respectively associated with the generated images that are compared become progressively smaller with each iteration, where one or more iterations are performed until a predetermined threshold number of generated images remain, wherein each portion of signature respectively associated with a generated image is a hash table that contains a plurality of table locations where a respective value corresponding to a respective segment of the generated image is entered into a respective table location for each segment of the generated image, and wherein the portion of the signature associated with the captured image is a hash table that contains a plurality of table locations where a respective value corresponding to a respective segment of the captured image is entered into a respective table location for each segment of the captured image; and means for retrieving the electronic document.

34. The system of claim 33, further comprising:

means for generating a signature that includes features that are highly specific to the generated image; and means for generating a signature corresponding to the captured image, the signature includes features that are highly specific to the captured image.

35. The system of claim 34, further comprising means for comparing the signature corresponding to the generated image with the signature corresponding to the captured image.

36. The system of claim 34, further comprising means for accounting for error that occurs when capturing the image of the printed document.

37. The system of claim 33, further comprising:

means for partitioning the generated image into a plurality of segments;

means for partitioning the captured image into a plurality of segments where each segment corresponds to respective segments associated with the generated image; and means for comparing a segment of the stored image with a corresponding segment of the captured image.

38. A machine-implemented system that facilitates indexing and/or retrieval of a document, comprising:

a processor;

a query component that receives an image of a printed document;

a caching component that generates and stores an image corresponding to the image of the printed document prior to the query component receiving the image of the printed document; and a comparison component that determines and retrieves the stored image via comparing location of words and width of words within the stored image to location of words and width of words within the received image of the printed document, the comparison component iteratively compares a portion of a signature associated with the received image with corresponding portions of signatures respectively associated with the stored images and excludes each stored image whose signature does not match the signature of the received image to facilitate identification of a match to the printed document, the portion of the signature associated with the received image and the portion of the signatures respectively associated with the stored images that are compared become progressively smaller with each iteration, where one or more iterations are performed until a predetermined threshold number of signatures associated with stored images remain, wherein location of words and width of words within at least a portion of a stored image is represented as a portion of a signature of the stored image, and location of words and width of words within at least a portion of the received image of the printed document is represented as a portion of a signature of the received image, wherein each portion of signature respectively associated with a stored image is a hash table that contains a plurality of table locations where a respective value corresponding to a respective segment of the stored image is entered into a respective table location for each segment of the stored image, and wherein the portion of the signature associated with the received image is a hash table that contains a plurality of table locations where a respective value corresponding to a respective segment of the received image is entered into a respective table location for each segment of the received image.

39. A computer storage medium having computer executable instructions stored thereon to facilitate document retrieval and/or indexing comprising:

return at least one stored image of an electronic document to a user based at least in part upon topological word properties of at least one captured image corresponding to the electronic document; and an iterative comparison of a portion of a signature associated with the at least one captured image with corresponding portions of signatures respectively associated with the at least one stored image and excludes each stored image whose signature does not match the signature of the at least one captured image to facilitate identification of a match to the electronic document, wherein the portion of the signature associated with the at least one captured image and the portion of the signatures respectively associated with the at least one stored image that are compared become progressively smaller with each iteration, where one or more iterations are performed until a predetermined threshold number of signatures associated with the at least one stored image remains, wherein the topological word properties comprise at least width of respective words, wherein the portion of the signature associated with the at least one captured image is based at least in part on topological word properties of a corresponding portion of the at least one captured image, and the portion of signature associated with the at least one stored image is based at least in part on topological word properties of a corresponding portion of the at least one stored image, wherein each portion of a signature respectively associated with a stored image is a hash table that contains a plurality of table locations where a respective value corresponding to a respective segment of the stored image is entered into a respective table location for each segment of the stored image, and wherein the portion of the signature associated with the captured image is a hash table that contains a plurality of table locations where a respective value corresponding to a respective segment of the captured image is entered into a respective table location for each segment of the captured image.

40. A computer storage medium having a data structure thereon to facilitate document retrieval and/or indexing comprising, the data structure comprising:

a component that receives image(s) of at least a portion of a printed document; and a search component that facilitates retrieval of an electronic document, the electronic document corresponding to the image(s) associated with the printed document, the retrieval based at least in part upon corresponding word-level topological properties when comparing the image(s) associated with the printed document and generated image(s) of the electronic document, the word-level topological properties comprise at least width of words; and a comparison component that is associated with the search component and iteratively compares a portion of a signature associated with the received image associated with the printed document with corresponding portions of signatures respectively associated with the generated images and excludes each generated image whose signature does not match the signature of the received image to facilitate location of a match to the printed document, wherein the portion of the signature associated with the received image and the portion of the signatures respectively associated with the generated images that are compared become progressively smaller with each iteration, where one or more iterations are performed until a predetermined threshold number of signatures associated with generated images remain, wherein the portion of the signature associated with the received image is based at least in part on word-level topological properties of a corresponding portion of the received image, and portions of signature respectively associated with the generated images is based at least in part on word-level topological properties of corresponding portions of the generated images, wherein each portion of a signature respectively associated with a generated image is a hash table that contains a plurality of table locations where respective value corresponding to a respective segment of the generated image is entered into a respective table location for each segment of the generated image, and wherein the portion of the signature associated with the received image is a hash table that contains a plurality of table locations where a respective value corresponding to a respective segment of the received image is entered into a respective table location for each segment of the received image.

41. A personal digital assistant comprising the system of claim 1.

* * * * *

UNITED STATES PATENT AND TRADEMARK OFFICE
CERTIFICATE OF CORRECTION

| | | |
|---|---|---|
| PATENT NO. | : 7,475,061 B2 | Page 1 of 1 |
| APPLICATION NO. | : 10/758370 | |
| DATED | : January 6, 2009 | |
| INVENTOR(S) | : David M. Bargeron et al. | |

It is certified that error appears in the above-identified patent and that said Letters Patent is hereby corrected as shown below:

In column 31, line 17, in Claim 16, delete "farther" and insert -- further --, therefor.

Signed and Sealed this
Twenty-sixth Day of April, 2011

David J. Kappos
*Director of the United States Patent and Trademark Office*